United States Patent
Awadh et al.

(10) Patent No.: US 12,275,898 B2
(45) Date of Patent: *Apr. 15, 2025

(54) HYDRODESULFURIZATION REACTION COMPOSITION

(71) Applicant: King Fahd University of Petroleum and Minerals, Dhahran (SA)

(72) Inventors: Tawfik Abdo Saleh Awadh, Dhahran (SA); Saddam Ahmed Al-Hammadi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,721

(22) Filed: Mar. 15, 2024

(65) Prior Publication Data

US 2025/0034461 A1    Jan. 30, 2025

Related U.S. Application Data

(63) Continuation of application No. 17/751,497, filed on May 23, 2022, now Pat. No. 11,970,665, which is a
(Continued)

(51) Int. Cl.
*C10G 45/08* (2006.01)
*B01J 21/04* (2006.01)
(Continued)

(52) U.S. Cl.
CPC .............. *C10G 45/08* (2013.01); *B01J 21/04* (2013.01); *B01J 23/75* (2013.01); *B01J 23/88* (2013.01);
(Continued)

(58) Field of Classification Search
None
See application file for complete search history.

(56) References Cited

U.S. PATENT DOCUMENTS 9,259,728 B2    2/2016    Kim et al.
2017/0369792 A1  12/2017   Yamani et al.

FOREIGN PATENT DOCUMENTS

CN    101890379 B    9/2012
CN    106268976 A    1/2017
(Continued)

OTHER PUBLICATIONS

Jingcheng Zhang, et al., "In situ FT-IR spectroscopy investigations of carbon nanotubes supported Co—Mo catalysts for selective hydrodesulfurization of FCC gasoline", Journal of Natural Gas Chemistry, vol. 17, Issue 2, Jun. 2008, pp. 165-170.
(Continued)

*Primary Examiner* — Colin W. Slifka
(74) *Attorney, Agent, or Firm* — Oblon, McClelland, Maier & Neustadt, L.L.P.

(57) ABSTRACT

Carbon nanofiber doped alumina (Al-CNF) supported MoCo catalysts in hydrodesulfurization (HDS), and/or boron doping, e.g., up to 5 wt % of total catalyst weight, can improve catalytic efficiency. Al-CNF-supported MoCo catalysts, (Al-CNF-MoCo), can reduce the sulfur concentration in fuel, esp. liquid fuel, to below the required limit in a 6 h reaction time. Thus, Al-CNF-MoCo has a higher catalytic activity than Al—MoCo, which may be explained by higher mesoporous surface area and better dispersion of MoCo metals on the AlCNF support relative to alumina support. The BET surface area of Al—MoCo may be 75% less than Al-CNF-MoCo, e.g., 166 vs. 200 m$^2$/g. SEM images indicate that the catalyst nanoparticles can be evenly distributed on the surface of the CNF. The surface area of the AlMo-CoB5% may be 206 m$^2$/g, which is higher than AlMo-CoB0% and AlMoCoB2%, and AlMoCoB5% has the highest HDS activity, removing more than 98% sulfur and below allowed levels.

10 Claims, 30 Drawing Sheets

Related U.S. Application Data continuation of application No. 16/134,376, filed on Sep. 18, 2018, now Pat. No. 11,377,601.

(51) Int. Cl.
- *B01J 23/75* (2006.01)
- *B01J 23/88* (2006.01)
- *B01J 35/30* (2024.01)
- *B01J 35/40* (2024.01)
- *B01J 35/61* (2024.01)
- *B01J 35/63* (2024.01)
- *B01J 35/64* (2024.01)
- *B01J 37/02* (2006.01)
- *C10G 45/14* (2006.01)

(52) U.S. Cl.
CPC ............ *B01J 35/393* (2024.01); *B01J 35/40* (2024.01); *B01J 35/615* (2024.01); *B01J 35/633* (2024.01); *B01J 35/647* (2024.01); *B01J 37/0207* (2013.01); *C10G 45/14* (2013.01); *C10G 2300/1055* (2013.01); *C10G 2300/202* (2013.01); *C10G 2300/70* (2013.01); *C10G 2400/26* (2013.01)

(56) References Cited

FOREIGN PATENT DOCUMENTS

| | | |
|---|---|---|
| CN | 109420507 A | 3/2019 |
| MX | PA02012764 A | 6/2004 |

OTHER PUBLICATIONS

J. Zhang, et al., "Commercial carbon nanotubes as heterogeneous catalysts in energy related applications", Ipss basic solid state physics, Nov. 24, 2009, p. 1.

Chang et al, CN 109420507 A, English Translation from WIPO via Google Translate (Year: 2019).

Notice of Allowance, mailed May 6, 2022 in parent U.S. Appl. No. 16/134,376 (Year: 2022).

HYDRODESULFURIZATION REACTION COMPOSITION

CROSS-REFERENCE TO RELATED APPLICATIONS

The present application is a Continuation of U.S. application Ser. No. 17/751,497, now allowed, having a filing date of May 23, 2022, which is a continuation of U.S. application Ser. No. 16/134,376, now U.S. Pat. No. 11,377,601, having a filing date of Sep. 18, 2018.

BACKGROUND OF THE INVENTION

Field of the Invention

This application relates to hydrodesulfurization and catalysts useful in hydrodesulfurization.

Description of the Related Art

Diesel, oil, gasoline, and other unrefined or at least partially refined products usually contain a considerable amount of sulfur-containing compounds that generate $SO_X$ gases. These gases pollute the environment and lead to human health problems. From the petrochemical point of view, $SO_X$ gases reduce the efficiency of plant units and cause corrosion to reactors, pipes, storage vessels, and export vessels. Stricter environmental regulations have moved the oil industry to minimize sulfur content in refinery products and thereby meet new fossil fuel quality standards.

Various approaches to reducing sulfur content in crude oil and its fractions, such as gasoline, diesel, and jet fuel, include hydrodesulfurization (HDS), extractive desulfurization (EDS), oxidative desulfurization (ODS), adsorptive desulfurization (ADS) and biodesulfurization (BDS). HDS involves reacting fluid or fluidized fuel with a hydrogen stream over heterogeneous catalyst at high temperatures and pressures. EDS involves mixing fuels with suitable solvents and subsequently separating to extract the organosulfur species. ADS avoids high temperatures and removes organosulfur compounds by physical absorption on the surface/matrix of adsorbent material(s). ODS involves oxidizing organosulfur compounds with oxidant(s) and subsequently separating resulting sulfoxide(s) and/or sulfone(s) by solvent extraction. BDS employs microorganisms with an inherent capacity to transform and/or utilize organosulfur compound(s), especially through metabolism.

HDS is the most used of the above techniques in oil refining due to its relative effectiveness and practicality. However, HDS efficiency depends on the performance and stability of the catalyst(s) used. Academic and industrial communities have sought to develop new catalysts and improve available catalysts to ensure the effective desulfurization and conform with the mandated minimum levels.

A great deal of research in the field of heterogeneous catalysis has been devoted to the hydrodesulfurization of liquid fuels. Transportation fuels are major sources of $SO_2$, an air pollutant and cause of acid rain, which has led to regulations restricting sulfur emissions into the atmosphere from fuel consumption. Hydrotreating to remove sulfur from diesel or gasoline is important in any petrochemical plant. Ultra-clean fuel standards with respect to sulfur continually increase, for example, sulfur contents in diesel fuel in Europe can be no more than 10 ppm since 2009 and 15 ppm in the US since 2006.

Producing ultra-low sulfur gas oil at affordable costs requires developing and upgrading existing process technologies, including the catalysts used. Research has focused on new hydrotreating catalysts with a higher activity for HDS. Conventional HDS catalysts use nanometric $MoS_2$ crystallites with cobalt or nickel oxides supported on gamma-alumina, i.e., $\gamma$-$Al_2O_3$. Catalysts having an active phase with Mo or $MoS_2$, promoted with Ni or Co, supported on $\gamma$-$Al_2O_3$, are used widely for HDS in oil refineries.

The catalyst support can play a critical role in the stability and performance of catalysts used in HDS by providing surface area for active site dispersal. Research into enhancing HDS catalyst performance has included, for example, controlling promoters, tuning active phase and tailoring the structure of supports. Novel support(s) and/or dopants gained interest because HDS performance correlates to the physicochemical nature of the support as well as the active phase.

Supports can contribute to HDS catalytic efficacy through textural and/or acid-base properties which can be superior to those of simple oxides. Various materials have been investigated as HDS catalyst supports, including alumina (e.g., $\alpha$-$Al_2O_3$, and $\gamma$-$Al_2O_3$), zeolites, carbon structures, nanoporous carbon, mesoporous carbon, zirconia ($ZrO_2$), titania ($TiO_2$), and silica ($SiO_2$). Presently, $\gamma$-$Al_2O_3$ is the most widely used support material for HDS catalysts because of its mechanical strength and ability to impart stability to the catalyst under normally harsh HDS reaction conditions. Alumina normally has high surface area and good porosity and its structure generally includes acidic sites. However, alumina may interact strongly with certain transition metal oxides, potentially impede complete sulfidation, ultimately reducing the HDS catalyst performance.

Still, the most widely used support for hydro-refining catalysts is $\gamma$-$Al_2O_3$ due to its appealing mechanical properties, inherent acid-base features, and adjustable surface physicochemical properties. Conventional alumina has textural porosity with low surface area ($<250$ $m^2$/g) and widely dispersed pore size, which may constrain its catalytic activity. The structure of $\alpha$-$Al_2O_3$ may be relevant to developing viable species for HDS, though $\gamma$-$Al_2O_3$ in many cases provides higher surface area, e.g., for loading active catalyst, such as W, Ni, Mo and/or Co nanoparticles in the case of HDS.

Modification of sol-gel $Al_2O_3$ support with boron at various ratios during the sol-gel synthesis conventionally shows that the boron-to-aluminum (B:Al) ratio affects the structure and properties of the sol-gel prepared B—$Al_2O_3$ powders, and that the catalytic performance of catalysts prepared on the B—$Al_2O_3$ may depend on the B/Al ratio. In particular, an increase in the acidity of the $Al_2O_3$ by the introduction of B may improve the HDS properties of the catalysts.

US 2017/0369792 A1 by Yamani, et al., discloses a process for producing an unsupported molybdenum sulfide nanocatalyst comprising atomizing a molybdenum oxide solution to form a molybdenum oxide aerosol, pyrolyzing the molybdenum oxide aerosol with a laser beam to form the unsupported molybdenum-based nanocatalyst, and pre-sulfiding at least a portion of the unsupported molybdenum-based nanocatalyst to form an unsupported molybdenum sulfide nanocatalyst, wherein the unsupported molybdenum-based nanocatalyst, the unsupported molybdenum sulfide catalyst or both are in the form of nanoparticles with a diameter of 1 to 10 nm and in a distorted rutile crystalline structure. Yamani also discloses a method of selective deep hydrodesulfurization whereby a hydrocarbon feedstock having at least one sulfur-containing component and at least one hydrocarbon is contacted with the unsupported molybdenum sulfide nanocatalyst.

As noted, Yamani requires an unsupported catalyst. Yamani discloses neither a boron nor carbon nanofiber-modified molybdenum-cobalt catalyst supported on alumina, instead focusing on unsupported molybdenum and/or mixed metal (i.e., Mo, W, Co, and/or Ni) sulfide catalysts for hydrodesulfurization reactions.

CN 106268976 A by Li, et al., discloses a gasoline selective hydrodesulfurization catalyst, its make, and use. The total mass of the catalyst being 100%, Li's catalyst is prepared from 3 to 15 wt % of VIII group metal, 45 to 58 wt % of Mo, and 35 to 40 wt % of S. A preparation method of the catalyst comprises the following steps: 1, a defect-rich molybdenum disulfide nanosheet precursor with a non-stoichiometric ratio is prepared; 2, one kind of VIII group metal is added into the molybdenum disulfide nanosheet precursor through an ultrasonic assisting dipping method, the molar ratio of the VIII group metal to Mo is (0.1 to 0.5):1, the specific surface area of the molybdenum disulfide nanosheet precursor ranges from 40 $m^2/g$ to 90 $m^2/g$, the pore volume ranges from 0.1 mL/g to 0.25 mL/g, and the molar ratio of sulfur to molybdenum is (1.92 to 2.10):1. Li prepares defect-rich molybdenum disulfide by controlling the stoichiometric ratio of molybdenum disulfide, and exposing more active loci.

While Li teaches a hydrodesulfurization catalyst, Li's catalyst requires 35 to 40 wt. % of sulfur, and 45-58 wt % of Mo, and forms a defect-rich molybdenum sulfide with a specific surface area 40 to 90 $m^2/g$. Li's catalyst uses 3 to 15 wt. % of Group VIII group metal, which may be either Co or Ni. Li only describes supports in its background and comparative examples, apparently avoiding these and at least failing to describe supports for its invention, much less point to using an alumina support, modified or not. Li discloses neither a boron nor carbon nanofiber-modified molybdenum-cobalt catalyst supported on alumina.

MX PA 02012764 A by Toledo discloses a procedure for preparing molybdenum and tungsten disulfide nanotubes with an inorganic fullerenes-type structure for desulfurization from gasolines, diesel, or heavy hydrocarbons. Toledo's nanotubes include molybdenum disulfide or molybdenum tungsten, with stacking levels of 1 to 20 layers bound to each other by weak Van der Waals-type bonds, with a separation of 0.6 nm between layers and with lengths from 1 to 50 µm. Toledo's nanotubes have open ends and an internal diameter of 1 to 15 nm, with curved areas having catalytically active sites for hydrocarbon HDS reactions in the exterior and interior of the nanotubes.

While Toledo's catalysts are useful for hydrodesulfurization, its catalysts require tungsten and have specific surface areas of no more than 100 $m^2/g$. Moreover, Toledo does not contain nanostructures of carbon, but instead inorganic nanostructures. Toledo does not disclose doping with boron, and apparently fails to teach the use of an alumina support. Toledo discloses neither a boron nor carbon nanofiber-modified molybdenum-cobalt catalyst supported on alumina.

U.S. Pat. No. 9,259,728 to Kim, et al., disclose a catalyst having metal catalyst nanoparticles supported on natural cellulose fibers and a method of preparing the same, whereby natural cellulose fibers are subjected to specific pretreatment to increase a surface area and form defects on the surface thereof and metal catalyst nanoparticles are then supported on the cellulose catalyst support in a highly dispersed state, thereby providing improved catalysis while allowing production of the catalyst at low cost. The catalyst may be utilized for various catalytic reactions.

Kim indicates that cellulose is required. In addition, Kim requires neither Mo nor Co, nor an alumina support. Kim describes metal catalyst nanoparticles on cellulose including platinum, nickel, cobalt, and molybdenum, but not a combination of molybdeum and cobalt particularly. Kim does not mention carbon nanofibers or boron additives. Moreover, Kim does not disclose a boron or carbon nanofiber-modified molybdenum-cobalt catalyst supported on alumina.

CN 101890379 B by Wang, et al., discloses a bulk phase catalyst and its preparation. Wang's bulk phase catalyst is prepared from an inorganic oxide precursor, a hydroxide gel and an active metal hydroxide gel serving as raw materials by molding and roasting. Wang's bulk phase catalyst may be prepared from a hydroxide gel containing a surfactant and hydrocarbon components, which, after the hydroxide gel is molded and roasted, forms nano oxide particles by dehydrating the polymerized hydroxide. Wang's nano oxide particles have a rod-shaped basic structure and pile up into a framework structure in an unordered mode.

Wang may employ boron or phosphorous in its invention, but Wang has no particular teaching on metals useful, nor carbon nanofibers, nor the specific use of alumina. Wang allows the use of Ni, Co, Mo, W, Cu, Zn, Cr, Fe, Mn, Pt, or Ru, and exemplifies only singular metals, primarily Ni. Wang describes alumina, silica, titania, zirconia, lanthanum oxide, magnesia, or calcium oxide as supports, but appears to focus on nanostructured hydroxides. Wang discloses neither boron nor carbon nanofiber-modified molybdenum-cobalt catalyst, nor one supported on alumina.

Zhang et al.'s in *J. Nat. Gas Chem.* 2008, 17(2), 165-170, discloses carbon nanotubes supported Co—Mo catalysts (Co—Mo/CNTs) for selective hydrodesulfurization (HDS) of fluid catalytic cracking (FCC) gasoline, studies are carried out using in situ Fourier transform infrared spectroscopy (FT-IR). Zhang 2008 evaluates catalytic performances of Co—Mo/CNTs catalysts with a mixture of cyclohexane, diisobutylene, cyclohexene, 1-octene (60:30:5:5, volume ratio) and thiophene (0.5%, ratio of total weight) as model compounds to simulate FCC gasoline. Zhang I's HDS experimental results suggested that the HDS activity and selectivity of Co—Mo/CNTs catalysts were affected by Co/Mo ratio, that the optimal Co/Mo atomic ratio is about 0.4, and that the optimum reaction temperature is 260° C. Zhang I's in situ FT-IR studies revealed that 1-octene can be completely saturated at 200° C. Zhang I's FT-IR results indicate that thiophene HDS reaction occurred mainly through direct hydrogenolysis route, whereas thiophene HDS and diisobutylene hydrogenation reaction over Co—Mo/CNTs catalysts might occur on two different kinds of active sites.

Thus, Zhang 2008 relates to HDS and uses an MoCo catalysts modified with carbon nanotubes, rather than carbon nanofibers, i.e., Zhang I's carbon nanostructures are hollow. However, Zhang does not indicate using alumina as a support and instead impunes alumina as not useful, particularly in China or with hydrocarbon streams having more than 15% olefins, such as 40 to 50% in Chinese sources. Zhang 2008 states that the HDS activity and selectivity of Co—Mo/CNTs catalysts are higher than those of traditional ones under the same reaction conditions, such as Co—Mo/$Al_2O_3$ and Co—Mo/activated carbon catalysts. Moreover, Zhang 2008 fails to disclose a boron-modified molybdenum-cobalt catalyst, nor a carbon nanofiber-modified molybdenum-cobalt catalyst supported on alumina.

Zhang et al. in *Basic Solid State Physics* 2009, 246 (11-12), 2502-2506, discloses commercial carbon nanotubes (CNTs) in two heterogeneously catalyzed reactions, i.e., $NH_3$ decomposition and oxidative dehydrogenation of ethylbenzene (EB). For $NH_3$ decomposition, CNTs were used as supports for Co—Mo nanoparticles. The structure of fresh and used catalysts was characterized by X-ray diffraction (XRD), high-resolution transmission electron microscopy (HRTEM) and line-scan energy dispersive X-ray (EDX). Most of the nanoparticles are individually separated and the synergism mainly increases the long-term stability rather than the activity. For oxidative dehydrogenation, the metal-free CNTs display a superior performance as compared to the Fe-doped CNTs.

Zhang 2009 discloses using an MoCo catalyst in different reactions from HDS-$NH_3$ decomposition and oxidative dehydrogenation, and uses nanotubes, rather than nanofibers. Zhang 2009 appears to avoid alumina, and does not include any boron doping. Instead, Zhang 2009 has Fe-doping of its carbon nanotube support. Zhang 2009 does not disclose a boron or carbon nanofiber-modified molybdenum-cobalt catalyst supported on alumina.

Further recent investigations have focused on nanofilamentous carbons (NC), such as carbon nanofibers (CNF), fullerenes, and carbon nanotubes, as a catalyst support in the HDS. These studies mostly use Ni and/or Mo as active metals, rather than the combination of MoCo, and usually exclude alumina.

Thus, new catalysts combining high surface areas of NC with the mechanical strength of alumina, optionally or alternatively using certain dopants or additives, to improve alumina-based catalysts, could present worthy targets for HDS catalyst development.

SUMMARY OF THE INVENTION

Aspects of the invention provide catalysts, particularly hydrodesulfurization catalysts, comprising: catalytic material comprising molybdenum and cobalt, optionally as nanoparticles of molybdenum and/or cobalt; and a catalyst support comprising alumina; and (i) wherein the catalyst support further comprises carbon nanofibers dispersed on a surface of the alumina, and/or (ii) wherein the catalyst further comprises a dopant comprising boron, wherein the catalytic material is homogenously dispersed on the catalyst support. These catalysts may be optionally modified with any permutation of the following features.

The dopant comprising the boron may be present in a range of from 1 to 5.5 wt. % relative to total catalyst weight.

The catalytic material may comprise 12 to 18 wt. % of molybdenum, relative to the total catalyst weight, and/or 3 to 8 wt. % of cobalt.

BET surface areas of catalysts within the scope of the invention may be in a range of from 150 to 230 $m^2/g$.

The carbon nanofibers may have an average diameter of 20 to 40 μm.

Catalysts of the invention may have meso-pore surface areas in a range of from 165 to 185 $m^2/g$, total pore volumes in a range of from 0.3 to 0.33 $cm^3/g$, average pore diameters in a range of from 5 to 7 nm, and/or hierarchy factors in a range of from 0.02 to 0.035.

The catalytic material may comprise no more than 5 wt. % of any of W and/or Ni, or even no more than 5 wt. % of any metal besides Mo and Co, and/or no more than 5 wt. % of sulfur, outside of operational conditions.

Aspects of the invention provide methods of hydrodesulfurizing a first mixture comprising an organosulfur, the method comprising: contacting the first mixture with any catalyst(s) within the scope of the invention in the presence of hydrogen gas, thereby forming a second mixture comprising less sulfur than the first mixture, wherein the contacting is carried out at a temperature in a range of from 250 to 350° C. for up to 6 hours and a hydrogen gas partial pressure in a range of from 50 to 60 bar-a. Inventive methods may be ones in which the first mixture is contacted with the hydrogen gas for 5 to 6 hours, and a ratio of an organosulfur concentration in the second mixture to the organosulfur concentration in the first mixture is in a range of from 1:10 to 1:1000.

Aspects of the invention provide reactor systems, comprising: a vessel with an internal cavity that contains inventive catalyst(s) as described herein, wherein the vessel comprises (a) a hydrogen inlet configured to deliver hydrogen gas to the internal cavity, and (b) a feed inlet configured to deliver a sulfur-containing mixture to the internal cavity; a stirrer configured to stir the catalyst and the sulfur-containing mixture in the presence of the hydrogen gas; a first storage tank located upstream of the vessel and fluidly connected to the hydrogen inlet, wherein the first storage tank delivers the hydrogen gas to the hydrogen inlet; and a second storage tank located upstream of the vessel and fluidly connected to the feed inlet, wherein the second storage tank delivers the sulfur-containing mixture to the feed inlet, wherein the sulfur-containing mixture is contacted with the catalyst in the presence of the hydrogen gas to form a desulfurized mixture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
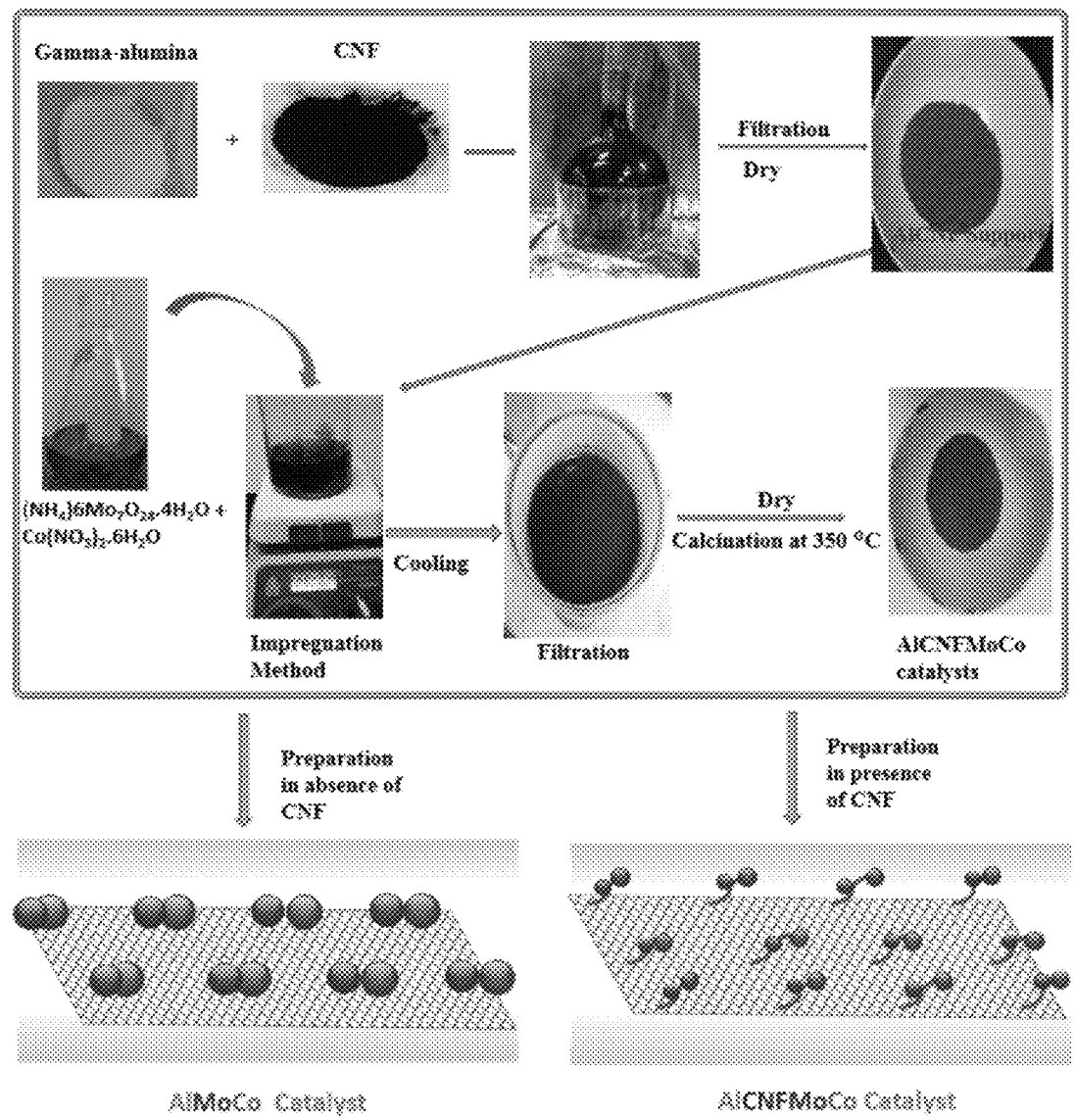
FIG. 1 shows a pictorial of synthetic steps useful in preparing certain Al-CNF-MoCo catalysts within the scope of the invention.

Aspects of the invention include catalysts, particularly hydrodesulfurization catalysts, comprising: catalytic material comprising or consisting essentially of—i.e., having no more than 25, 20, 15, 10, 5, 2.5, 1, 0.1, 0.001 wt. % other metals than—molybdenum and cobalt, optionally as nanoparticles of molybdenum and/or cobalt; and a catalyst support comprising alumina; and (i) wherein the catalyst support further comprises carbon nanofibers dispersed on a surface of the alumina, which nanofibers may have an average diameter in a range of from 20 to 40, 22.5 to 37.5, 25 to 35, or 27.5 to 32.5 µm, and/or (ii) wherein the catalyst further comprises a dopant comprising boron, which boron may be present in a range of from above 0 to 6, 1 to 5.5, 2 to 5.25, 3 to 5.15, 3.5 to 5.1, or 4 to 5 wt. % relative to total catalyst weight, wherein the catalytic material is homogenously dispersed on the catalyst support.

The catalytic material may comprise 12 to 18, 13 to 17, or 14 to 16 wt. % of molybdenum, relative to the total catalyst weight, and/or 3 to 8, 4 to 7, or 5 to 6 wt. % of cobalt. A ratio of the Mo to Co may be in a range of from 10:1 to 1:1, 8:1 to 1.25:1, 7:1 to 1.5:1, 6:1 to 1.75:1, 5:1 to 2:1, 4:1 to 2.25:1, or 3:1 to 2.5:1. Useful lower and upper limits of the Mo: Co ratio may be any of those in the preceding sentence, in any combination, and/or, for example, at least 1:1, 1.5:1, 2:1, 2.1:1, 2.2:1, 2.3:1, 2.4:1, 2.6:1, 2.75:1, 3:1, 3.25:1, 3.5:1, 3.75:1, 4:1, 4.5:1, 5:1, or 6:1. Upper limits may be, for example 12:1, 9:1, 7.5:1, 6.5:1, 6.25:1, or 5.5:1.

BET surface areas of catalysts within the scope of the invention may be in a range of from 150 to 230, 165 to 225, 180 to 220, 185 to 215, 190 to 210, or 195 to 205 m²/g. Exemplary BETs may be at least 125, 135, 145, 155, 160, 170, 175, 180, 182.5, 187.5, or 192.5 m²/g, and/or no more than 232, 230, 222.5, 217.5, 212.5, 207.5, or 202.5 m²/g.

Catalysts of the invention may have (i) meso-pore surface areas in a range of from 165 to 185, 167.5 to 182.5, 170 to 180, 172.5 to 177.5, or 173 to 176 m²/g; (ii) total pore volumes in a range of from 0.3 to 0.33, 0.305 to 0.325, 0.31 to 0.323, or 0.315 to 0.320 cm³/g; (iii) average pore diameters in a range of from 5 to 7, 5.1 to 6.9, 5.2 to 6.8, 5.3 to 6.7, 5.4 to 6.6, 5.5 to 6.5, 5.6 to 6.5, or 5.75 to 6.25 nm; and/or (iv) hierarchy factors in a range of from 0.02 to 0.035, 0.0225 to 0.0325, 0.023 to 0.032, 0.0235 to 0.0315, 0.024 to 0.031, 0.0245 to 0.0305, 0.025 to 0.030, 0.0255 to 0.0295, or 0.026 to 0.029. Any of these features may be combined arbitrarily, e.g., (i) with (iv), (ii) with (iv), (i) with (iii), (i) with (ii) and (iv), (i) with (ii) and (iii), or (i) through (iv).

The catalytic material may comprise no more than 33, 20, 15, 10, 7.5, 5, 4, 3, 2, 1, or 0.5 wt. % of any of W and/or Ni, and/or even no more than 33, 20, 15, 10, 7.5, 5, 4, 3, 2, 1, or 0.5 wt. % of any metal besides Mo and Co, and/or no more than 33, 20, 15, 10, 7.5, 5, 4, 3, 2, 1, or 0.5 wt. % of sulfur—as synthesized and/or outside of operational conditions.

Aspects of the invention provide methods of hydrodesulfurizing a first mixture comprising an organosulfur, the method comprising: contacting the first mixture with any catalyst(s) within the scope of the invention in the presence of hydrogen gas, thereby forming a second mixture comprising less sulfur than the first mixture, wherein the contacting is carried out at a temperature in a range of from 250 to 350, 260 to 340, 275 to 325, 280 to 320, 285 to 315, 290 to 310, or 295 to 305° C. for up to 10, 9, 8, 7, or 6 hours, i.e., 1 to 7, 2 to 6.5, 4 to 6.25, or 5 to 6 hours, and a hydrogen gas partial pressure in a range of from 50 to 60, 52.5 to 57.5, 53 to 57, or 53.5 to 56.5 bar-a. Inventive methods may be ones in which the first mixture is contacted with the hydrogen gas for 5 to 6 hours, and a ratio of an organosulfur concentration in the second mixture to the organosulfur concentration in the first mixture is in a range of from 1:10 to 1:100000, 1:25 to 1:10000, or 1:50 to 1:1000. A total reduction of organosulfur content in the fuel may 90, 92.5, 95, 97.5, 98, 99, 99.5, 99.9, 99.95, or 99.99 wt. %, or even all detectable amounts, after 6 hours at 300° C. under 50 bar-a H$_2$, with no more than 10, 8, 7.5, 7, 6, 5, 4, 3, 2.5, 2, 1, or even 0.5 wt. % catalyst per total reaction mixture.

Aspects of the invention provide reactor systems, comprising: a vessel with an internal cavity that contains inventive catalyst(s) as described herein, wherein the vessel comprises (a) a hydrogen inlet configured to deliver hydrogen gas to the internal cavity, and (b) a feed inlet configured to deliver a sulfur-containing mixture to the internal cavity; a stirrer configured to stir the catalyst and the sulfur-containing mixture in the presence of the hydrogen gas; a first storage tank located upstream of the vessel and fluidly connected to the hydrogen inlet, wherein the first storage tank delivers the hydrogen gas to the hydrogen inlet; and a second storage tank located upstream of the vessel and fluidly connected to the feed inlet, wherein the second storage tank delivers the sulfur-containing mixture to the feed inlet, wherein the sulfur-containing mixture is contacted with the catalyst in the presence of the hydrogen gas to form a desulfurized mixture.

Catalysts according to the invention are most preferably used with a support, particularly one containing alumina, particularly γ-Al$_2$O$_3$. Useful supports may include, for example, at least 50, 60, 75, 85, 90, or 95 wt. % alumina. The amount of alumina in the inventive catalysts may be at least 15, 20, 25, 33, 40, 50, 60, 70, or 75 wt. %, relative to the total catalyst weight. Catalysts within the scope of the invention generally include, as metals, molybdenum (Mo) and cobalt (Co), and may include further optional metals, such as tungsten (W), nickel (Ni), ruthenium (Ru), and/or rhodium (Rh). Catalysts within the invention may exclude any or all of the optional metals, or may contain no more than 10, 7.5, 5, 2.5, 2, 1, 0.5, 0.1, 0.001, or 0.0001 wt. % or no more than trace detectable amounts of any or all of the optional metals (i.e., W, Ni, Ru, and/or Rh) or any other metals, e.g., Fe, Cu, Pd, Pt, Re, Zn, Ag, Au, etc., beyond Mo and Co. Catalysts according to the invention generally include no more than 25, 20, 15, 10, 5, 4, 3, 2, 1, 0.5, 0.1, 0.001, or 0.0001 wt. % or no more than trace detectable amounts of sulfur, at least in synthesis of the catalysts. Carbon nanostructures preferred in the invention may be nanofibers, rather than hollow tubes, even if this may sacrifice specific surface area in some circumstances. For example, the number of tube structures included in the carbon nanostructures may be fewer than 50, 33, 25, 20, 15, 10, 7.5, 5, 2.5, 2, 1, or 0.1 wt. %, relative to all carbon nanostructures in the catalyst. Likewise, the catalysts generally contain less than 15, 10, 7.5, 5, 2.5, 2, 1, 0.1, 0.01, 0.001, or 0.0001 wt. % cellulose or other carbohydrates.

The types of fuels relevant to hydrodesulfurization using one or more catalysts according to the invention are generally not limited, but may include, for example, refined and/or partially refined products (pet ethers, gasoline, diesel, kerosene, jet fuel, ethane, propane, butane, isobutane, pentane, hexane, heptane, octane, nonane, decane, undecane, dodecane, tridecane, tetradecane, pentadecane, hexadecane, isomers and unsaturated homologs of these, etc.), mineral oil, raw pyrolysis gasoline (RPG), hydrotreated pyrolysis gasoline, reformate, heavy aromatics, jet oil, atmospheric gas oil, residue fluid catalytic cracking (RFCC) gasoline, fluid catalytic cracking (FCC) gasoline, light cracked naphtha, RFCC heavy naphtha, FCC decanted oil, vacuum gas oil, coker gas oil, coker diesel, coker naphtha, heavy and reduced petroleum crude oil, petroleum atmospheric distillation bottom, petroleum vacuum distillation bottom, asphalt, bitumen, tar sand oil, shale oil, liquid/solid products obtained by coal liquefaction or coal carbonation including coal tar, tar oil, light cycle oil (LCO), phenolic oil, light anthracene oil, heavy anthracene oil, and pitch, Fischer-Tropsch products, waxes, wood carbonation derivatives such as wood tar, hardwood tar, resinous tar, and any combinations of two or more of any of these.

Incipient wetness impregnation, typically carried out in aqueous solution, is the most common method of catalyst preparation, but least controlled by adsorption. Generally, a support is impregnated with a precursor-containing solution and dried. Metal salts used as catalyst precursors are dissolved in the impregnating solution, the volume of which is made to match the pore volume of the support. The metal loading is controlled by the concentration of metal ions in solution, which may mean that the support surface plays an insignificant role, merely acting as a physical support. The dry product is then further treated through activation treatments (e.g. calcination and/or reduction) to obtain the desired catalyst.

Activity of boron-doped CoMo catalysts supported on γ-Al$_2$O$_3$, can be modified, based on the amount of boron relative to the total catalyst weight. AlMoCoB0%, AlMoCoB2%, and AlMoCoB5% were prepared through an incipient wetness impregnation method. As used herein, AlMoCox % indicates MoCo catalysts supported on γ-Al$_2$O$_3$, where x is the boron percentage of the total catalyst weight. The results unexpectedly indicated that AlCoMoB5% had the best performance in HDS of dibenzothiophene (DBT).

Aspects of the invention may combine alumina with other support materials, e.g., activated carbon, zeolite, alternate alumina morphology (e.g., α-Al$_2$O$_3$, γ-Al$_2$O$_3$), carbon structure, nanoporous carbon, mesoporous carbon, zirconia, titania, and/or silica, to tailor the positive characteristics of combined system components.

Referring now to the drawings, wherein like reference numerals designate identical or corresponding parts throughout the several views.

The steps in preparing the Al-CNF-MoCo catalyst are depicted in FIG. 1, involving loading γ-Al$_2$O$_3$ with MoCo metals, with carbon nanofibers (CNF), or without CHF for comparison. The catalysts prepared can be characterized structurally and morphologically by BET N$_2$ physisorption, temperature-programmed reduction (TPR) powder X-ray diffraction (XRD), scanning electron microscope (SEM), infrared spectroscopy (FT-IR), and thermogravimetric analysis (TGA), as exemplified in the drawings.

Figure 2A:
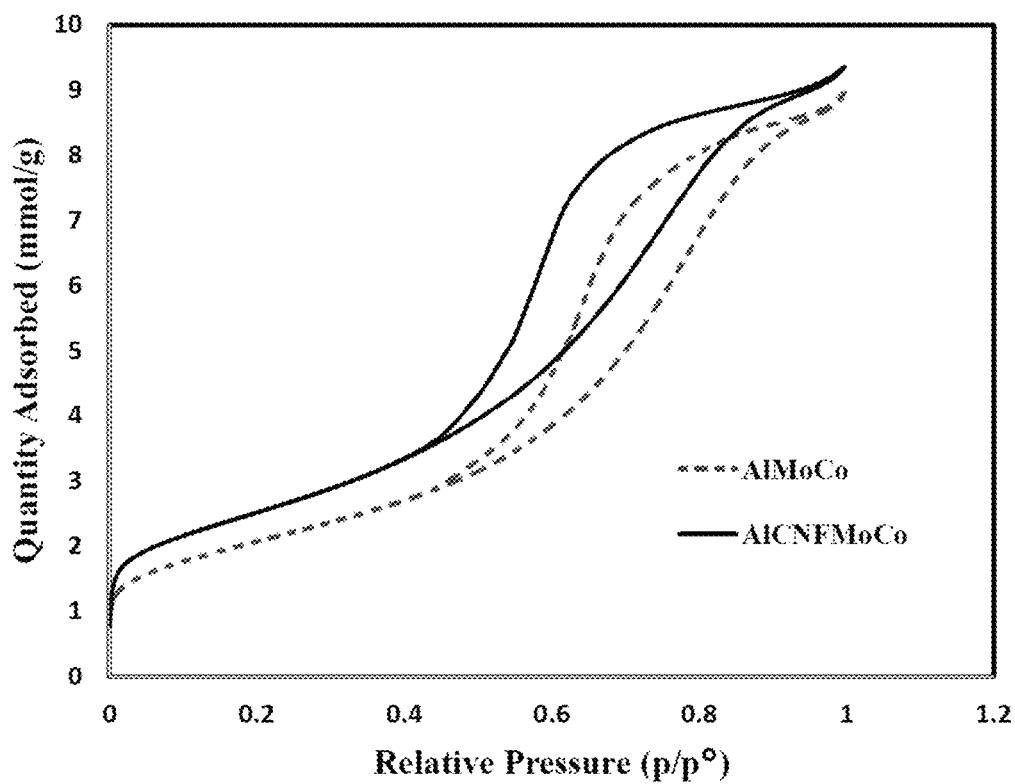
FIGS. 2A and B show the $N_2$ adsorption and desorption isotherm (a) and the pore size distribution (b) of Al-CNF-MoCo and Al—MoCo catalysts as described in Example 1.

FIG. 2A provides N$_2$ adsorption-desorption isotherm curves of Al—MoCo and Al-CNF-MoCo prepared as disclosed in Example 1 below. The isotherm curves of both catalysts resemble a type IV isotherm with micro/mesopores contributing to adsorption-desorption processes. As seen in FIG. 2A, the N$_2$ uptake at low relatively pressure indicates a microporous nature of the material, while the hysteresis loop at high values of relative pressure indicates a mesoporous topography in the catalysts prepared. As shown in FIG. 2A, the quantity adsorbed-desorbed by Al-CNF-MoCo at any relative pressure is higher than the quantity adsorbed-desorbed by Al—MoCo.

Table 1, below, sets forth textural properties of the Al—MoCo and Al-CNF-MoCo catalysts. In Table 1, it can be observed that the Al-CNF-MoCo catalyst has higher mesopore surface area, micropore surface area, total-pore volume, and micropore volume than the Al—MoCo catalyst.

TABLE 1

| Catalyst | $S_{BET}$ (m$^2$/g) | $S_{Meso}$ (m$^2$/g) | $S_{Micro}$ (m$^2$/g) | $V_{micro}$ (cm$^3$/g) | $V_{total}$ (cm$^3$/g) | Avg. Pore Diam. (nm) | Hierarch. Factor |
|---|---|---|---|---|---|---|---|
| Al—MoCo | 166 | 155 | 11 | 0.0044 | 0.3055 | 7.15 | 0.013 |
| Al—CNF—MoCo | 200 | 177 | 23 | 0.0096 | 0.3179 | 6.24 | 0.027 |

Figure 2B:
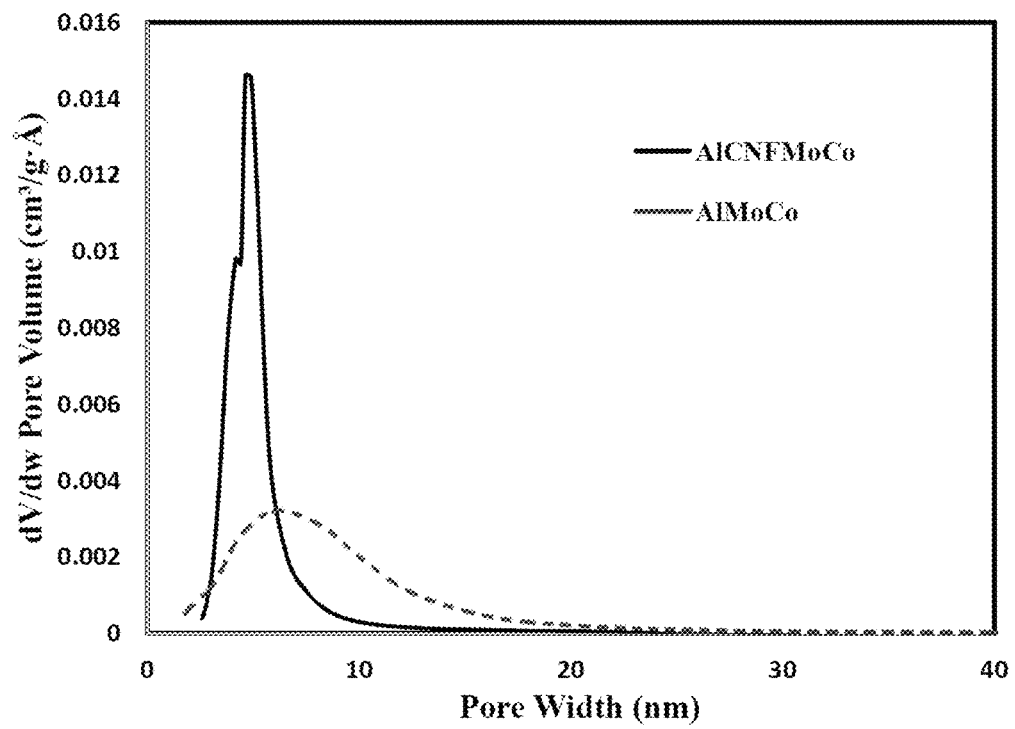

FIG. 2*b* depicts the pore size distribution of the Al-CNF-MoCo and Al—MoCo catalysts synthesized in Example 1. FIG. 2B indicates that both catalysts have a mesoporous character with close dominant pore diameter values of 6.24 and 7.15 nm, respectively. These results indicate that, surprisingly, the addition of CNF to the catalysts enhances most of the Al—MoCo textural properties without severely sacrificing the average pore diameter.

For investigating the effects of modification with CNF on the catalyst textural properties, a Hierarchical Factor (HF) for both materials was calculated using Equation 1:

$$HF = (V_{micro}/V_{total}) * (S_{meso}/S_{BET}).\qquad\text{Eq. 1}$$

By substituting the textural parameter values into the Equation 1, HF values may be obtained for Al—MoCo and Al-CNF-MoCo, as seen in Table 1. These results show that Al-CNF-MoCo has a higher HF value than Al—MoCo, indicating that that Al-CNF-MoCo may have a higher adsorption efficiency. The higher $N_2$ quantity adsorbed-desorbed by Al-CNF-MoCo at any relative pressure than Al—MoCo, noted above and seen in FIG. 2A, supports the HF conclusion.

Figure 3:
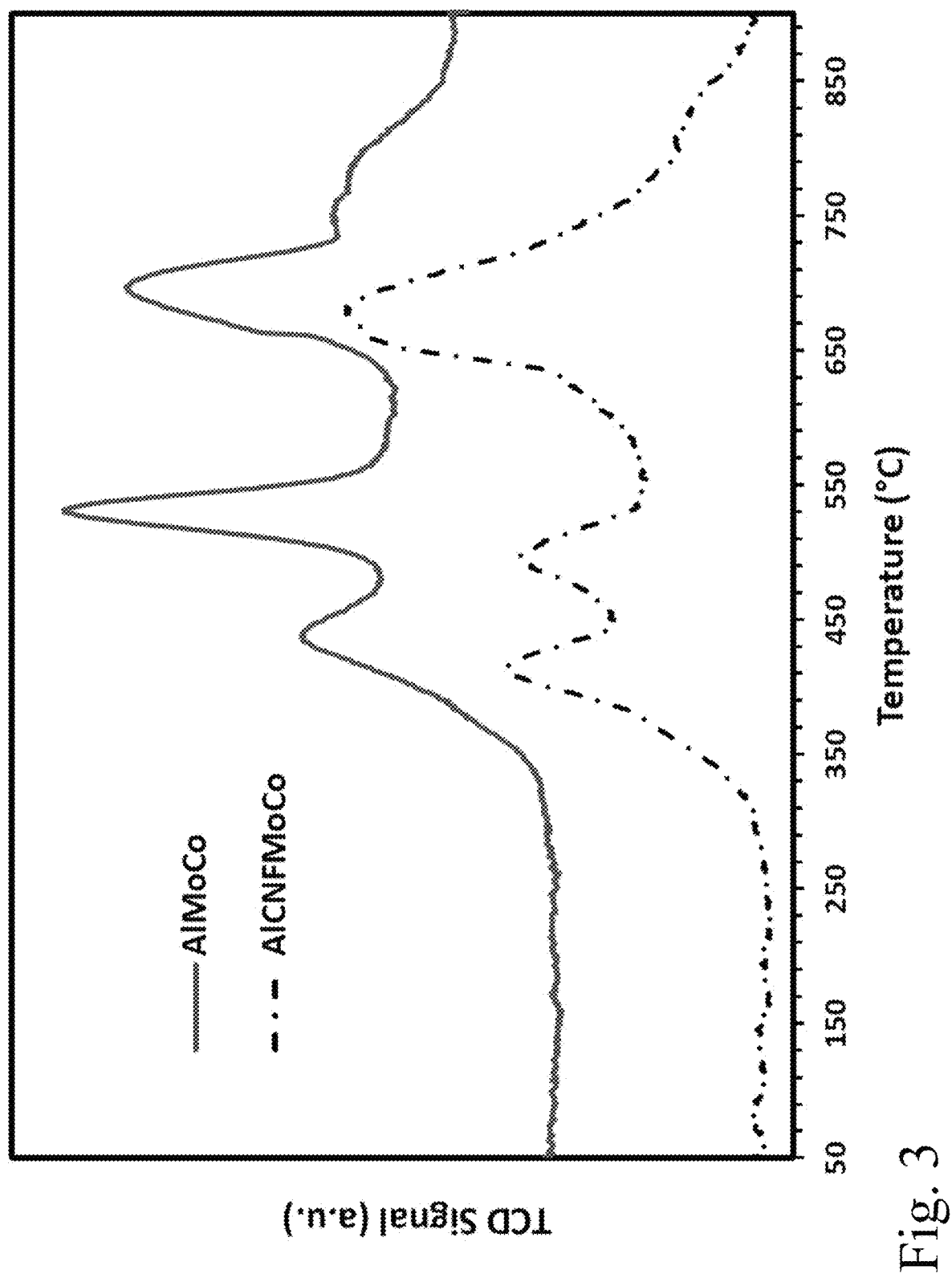
FIG. 3 shows the $H_2$-TPR profiles of (a) the Al—MoCo catalyst and (b) the Al—MoCo-CNF catalyst prepared as described Example 1.

FIG. 3 discloses $H_2$-temperature-programmed reduction (TPR) study of the reduction potential of metal oxides supported on Al-CNF or alumina alone. FIG. 3 displays the $H_2$-TPR profiles of the Al—MoCo and the Al-CNF-MoCo catalysts prepared as described below in Example 1. As seen in FIG. 3, these Al—MoCo and the Al—MoCo-CNF catalysts show reduction peaks of $H_2$ within the temperature range of from 420 to 530° C. and a reduction peak in a range of from 660 to 700° C. The first two peaks in FIG. 3 can be assigned to the reduction of Mo polymeric octahedral structures, i.e., $Mo^{6+}$ to $Mo^{4+}$T. he higher temperature reduction at roughly 660° C. can be assigned the reduction of $Mo^{4+}$ to $Mo^0$ in the polymeric octahedral, tetrahedral, and bulk molybdena species. The reduction temperatures for the Al-CNF-MoCo catalyst was indicated to be lower than that of Al—MoCo in both regions. The lower and higher temperature reductions of Mo are presented below in Table 2.

TABLE 2

| Catalyst | Temp. at Peak Max. (° C.) | Quantity (cm$^3$/g STP) | Peak Concentration (%) |
|---|---|---|---|
| Al-CNT-MoCo | 413.6 | 3.84 | 0.0604 |
| | 496.2 | 3.52 | 0.053 |
| | 738.9 | 33.05 | 0.156 |
| Al—MoCo | 435.7 | 3.67 | 0.0509 |
| | 530.5 | 8.76 | 0.1549 |
| | 696.7 | 10.13 | 0.1146 |

The increase in the reduction temperatures correlates to strong interaction of the metal to the support, decreasing the dispersion, and thus, affecting the performance of the catalysts. These structural indications are supported by the SEM images of the Al-CNF-MoCo catalyst indicating well dispersed MoCo on the CNF. As shown in Table 2, the peak locations at the lower temperatures for the Al-CNF-MoCo catalyst have lower values than Al—MoCo, meaning that Al-CNF-MoCo has lower metals-to-support interactions than Al—MoCo. Accordingly, the Al-CNF-MoCo catalyst may have better metal dispersion on supports, particularly alumina and CNF-modified alumina, which may increase HDS catalytic activity.

Figure 4:
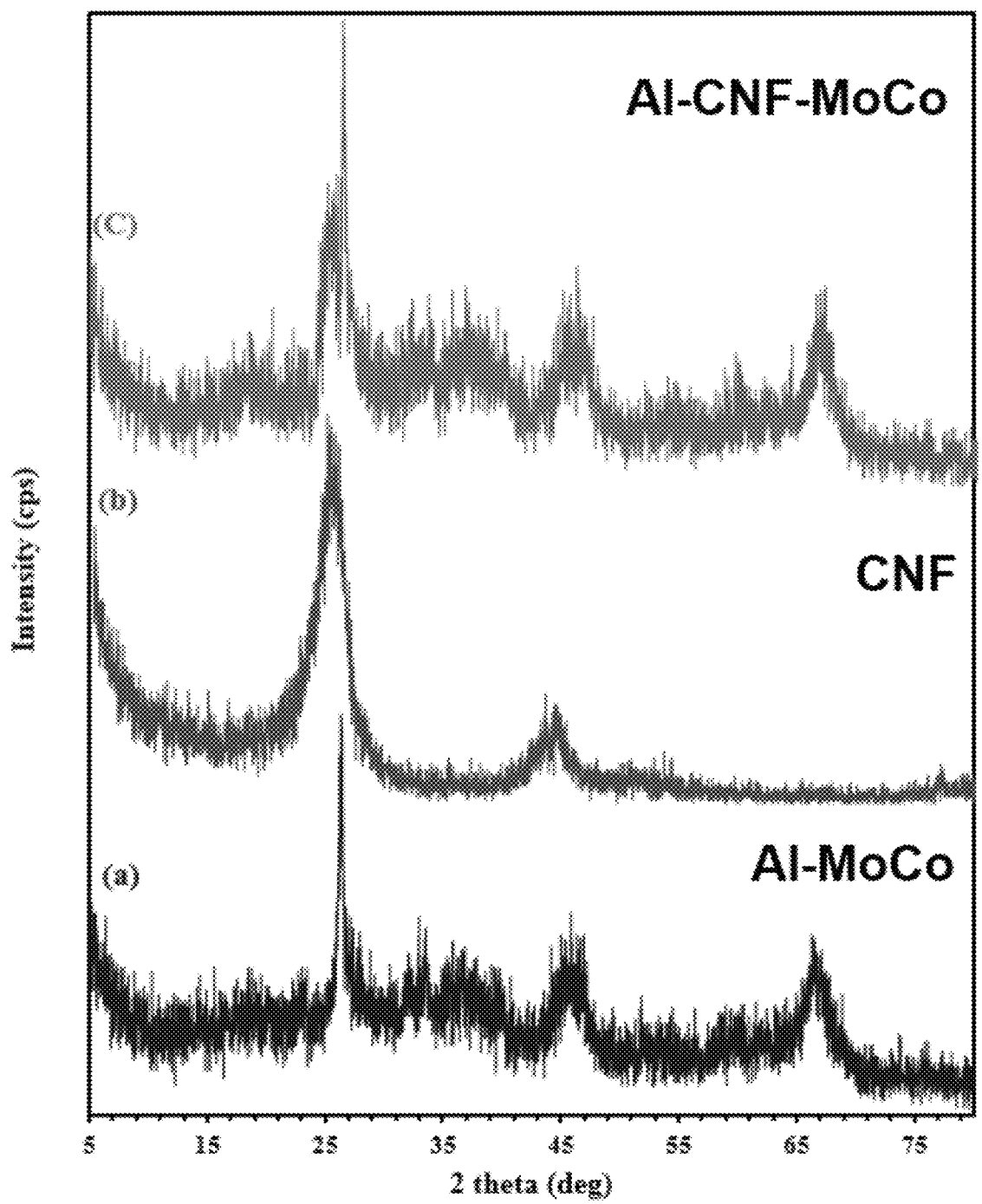
FIG. 4 shows the XRD patterns of (1) the Al—MoCo catalyst, (b) CNF alone, and (c) the Al-CNF-MoCo catalyst prepared as described Example 1.
Figure 5A:
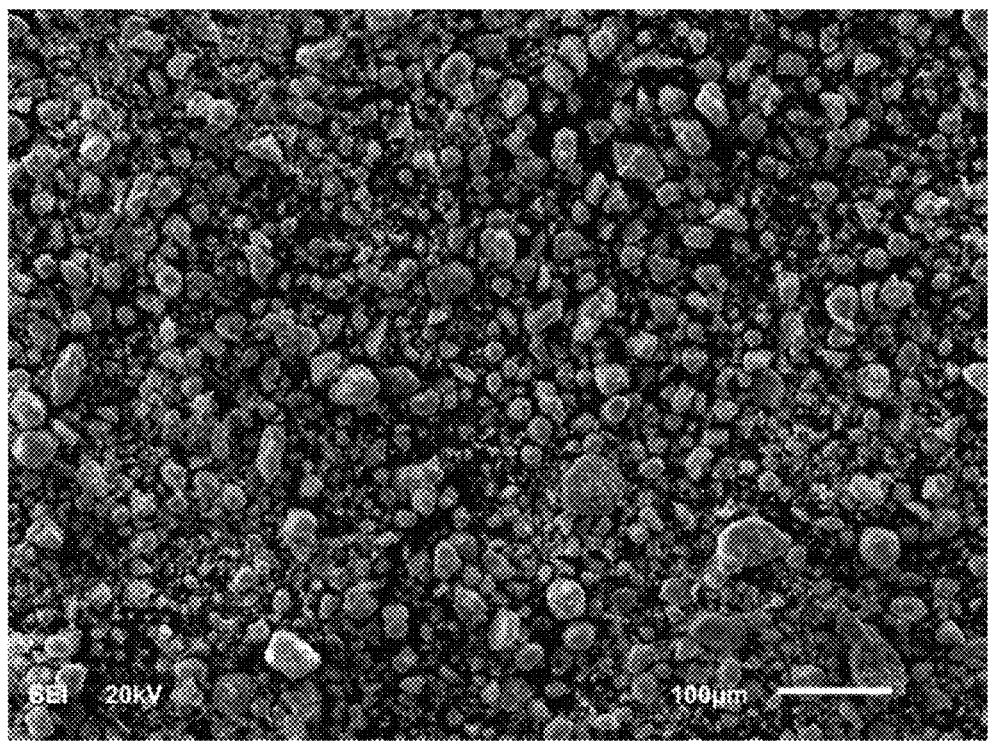
FIG. 5A to D show SEM images at various scales (a, b, c) to the Al-CNF-MoCo catalyst prepared as described Example 1 and (d) the corresponding EDX spectrum.
Figure 5B:
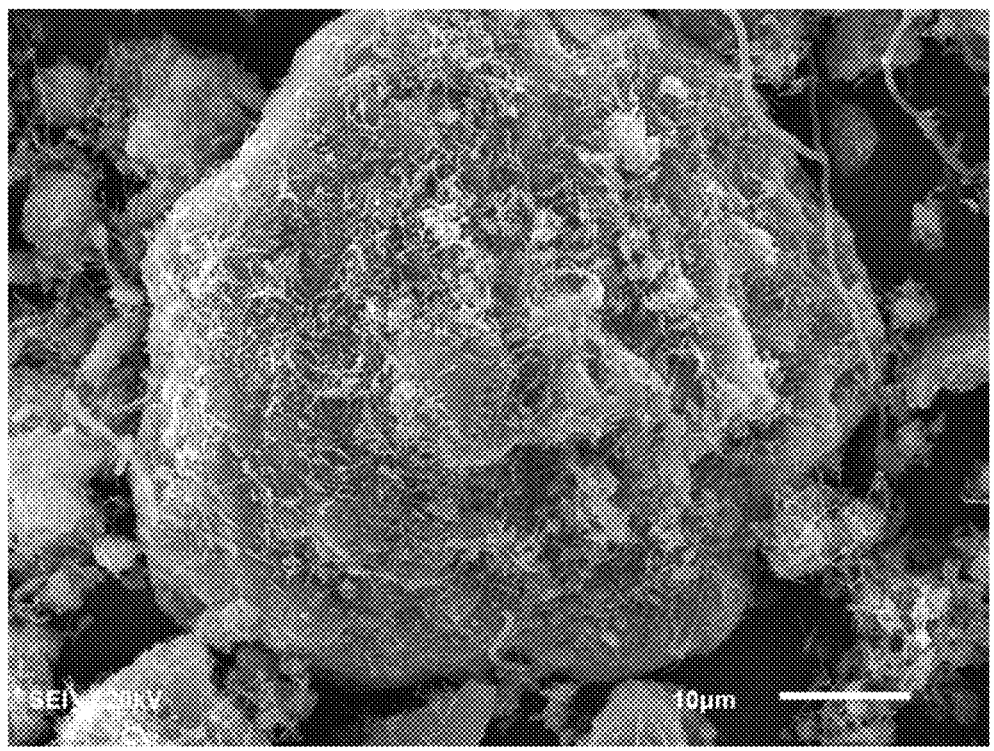
Figure 5C:
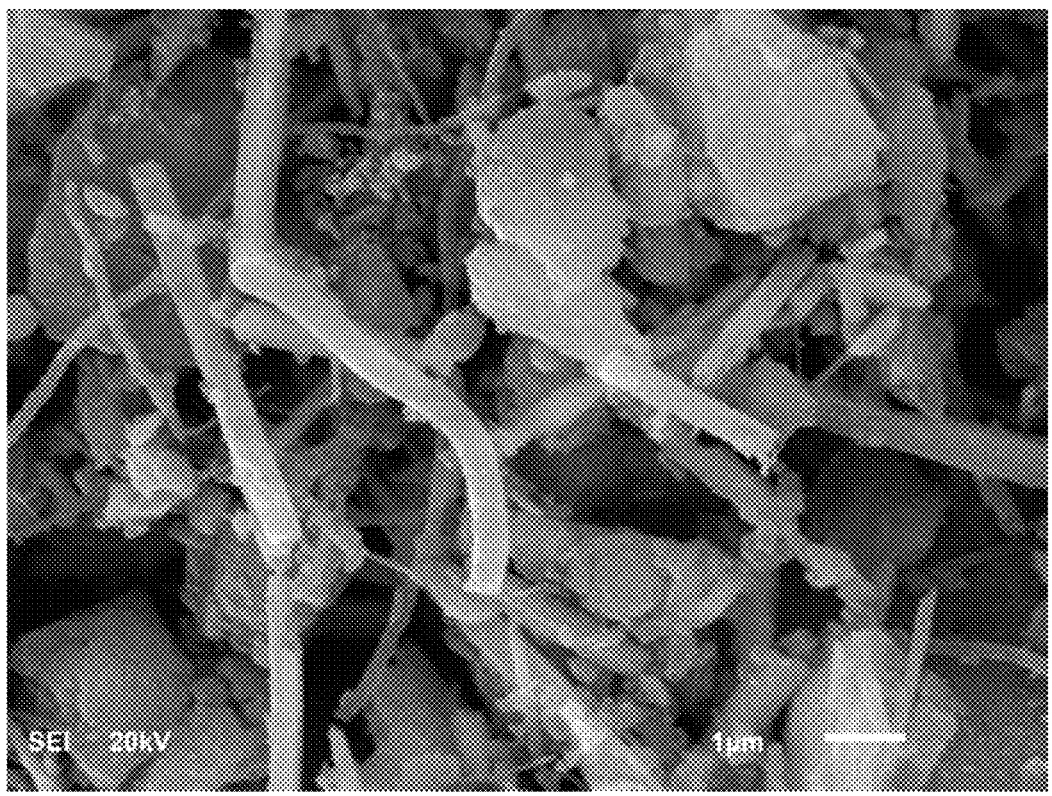
Figure 5D:
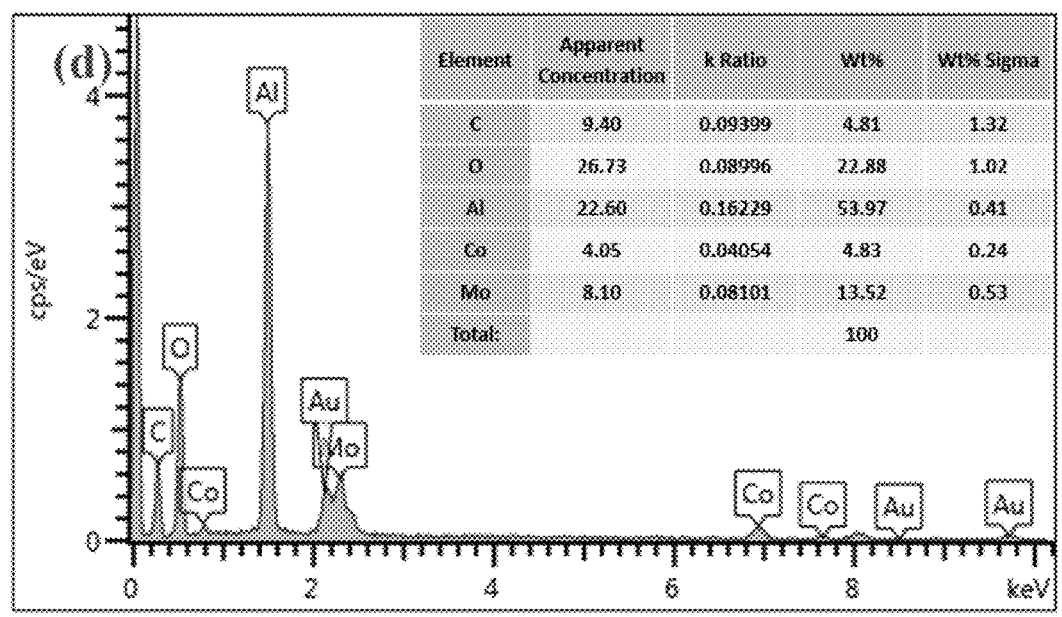

FIG. 4 shows XRD patterns of the CNF and Al-CNF-MoCo and Al—MoCo catalysts prepared according to the method in Example 1 after calcination at 350° C. The XRD pattern of the CNF exhibits a predominant graphite (002) diffraction peak around 26°. The CNF also shows (100) and (101) reflections in the region between 42° and 45° and a low intensity (004) line near 55°. The diffraction pattern of Al—MoCo shows characteristic peaks of alumina and MoCo, confirming the presence of $CoMoO_x$ (JCPDS 00-021-868), and crystalline molybdenum oxide (JCPDS 01-072-0527). The presence of cobalt and molybdenum oxides affords a peak at 26.6°, attributable to monoclinic $CoMoO_4$. Characteristic peaks at 2θ=34°, 39°, 46.5°, and 66° are likewise attributable to MoCo, and the XRD pattern of the Al-CNF-MoCo catalyst shows characteristic CNF peaks. A clear difference between the XRD patterns of Al—MoCo and Al-CNF-MoCo is the graphite (002) diffraction peak at ~26°, which slightly overlaps with the Al peak at 26.6°, which indicates a successful embedding of CNF within the alumina support.

The morphologies of the Al-CNF-MoCo catalysts prepared according to the method in Example 1, and their elemental compositions, were investigated by scanning electron microscopy (SEM) and energy-dispersive X-ray (EDX) spectroscopy, as seen in FIG. 5A through D. The morphology of the Al-CNF-MoCo catalyst powder exhibits a small amount of carbon fibers, confirming the presence of CNF with a diameter of about 300 nm. The average diameter of these CNF tube will vary depending upon desired application, but, for example, may be anywhere in a range of from 10 nm to 1 μm, or 50 to 750 nm, 100 to 600 nm, 150 to 500 nm, 200 to 400 nm, 250 to 375 nm, or 275 to 333 nm. Average CNF lengths, while not necessarily limited, may be a range of from 0.1 to 50, 0.5 to 40, 1 to 30, 1.5 to 20, 1.75 to 15, 2 to 10, 2.25 to 7.5, or 2.5 to 5 μm. The SEM images in FIG. 5A to C also show uniformly distributed metal nanoparticles on the Al-CNF composite support surface, which may help minimize agglomeration. The CNFs may provide a high and/or adjustable surface area relative to alumina alone, and the surface area may allow dispersion of metal nanoparticles so as to increase the available active sites on the catalysts prepared. EDX analysis of the Al-CNF-MoCo catalysts, seen in FIG. 5D, indicate the elements Al, O, and C, due to the use of the Al-CNF composite support, as well as the presence of the catalyst metals, Mo (13.52 wt. %) and Co (4.83 wt. %).

Figure 6:
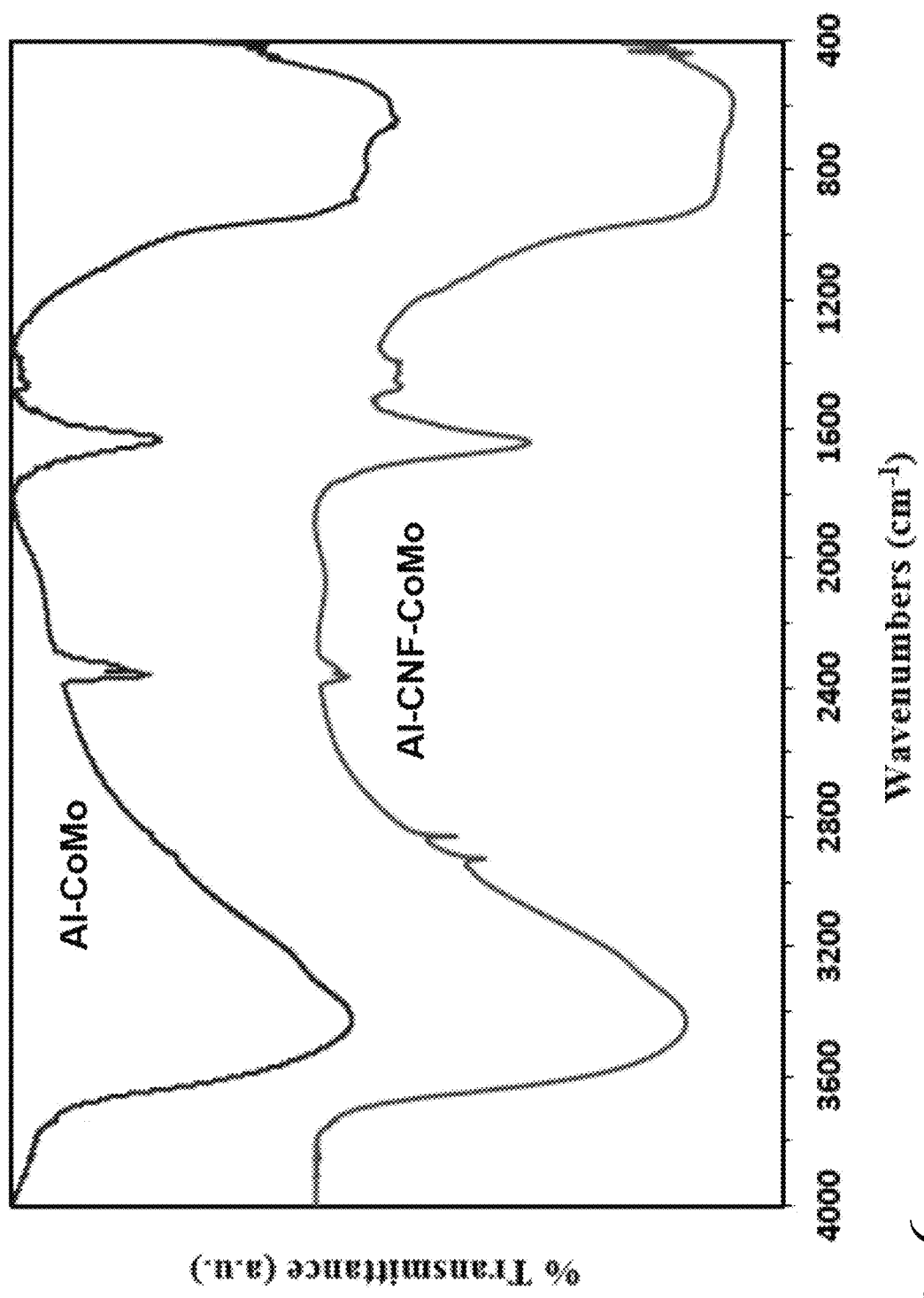
FIG. 6 shows the FT-IR spectra of the Al—MoCo catalyst and the Al—MoCo-CNF catalyst prepared as described Example 1.

FIG. 6 shows the FT-IR spectra of the Al-CNF-MoCo and Al—MoCo catalysts from Example 1, which likewise indicate the expected functional groups of the catalysts. The broad band around 550 to 870 cm$^{-1}$ in FIG. 6 can be attributed to symmetric and asymmetric MoO terminal stretches. The characteristic bands observed in the FT-IR spectrum of Mo=O at ~988, 878, and 634 cm$^{-1}$ may be ascribed to central vibrational modes of Mo=O. The dominant band at ~820 cm$^{-1}$ is related to the vibration of Mo—O—Mo bridging bonds. There could be an overlap of the characteristic peaks of Mo=O with that of the alumina which appeared at ~741 cm$^{-1}$ and ~641 cm$^{-1}$ (Al—O bands). The broad bands at 550 to 900 cm$^{-1}$ indicate that MoCo was highly dispersed on the alumina. In the upper FT-IR spectrum in FIG. 6, i.e., the FT-IR of AlMoCo, the broad band at ~3400 cm$^{-1}$ indicates the presence of —OH groups on the alumina surface, as an —OH stretching band of —Al—OH, and the band at 1637 cm$^{-1}$ can be attributed to —OH bending. After doping with CNF, bands appear at 2920 and 2850 cm$^{-1}$ for asymmetric and symmetric —CH$_2$— stretching vibrations in the CNF.

Figure 7:
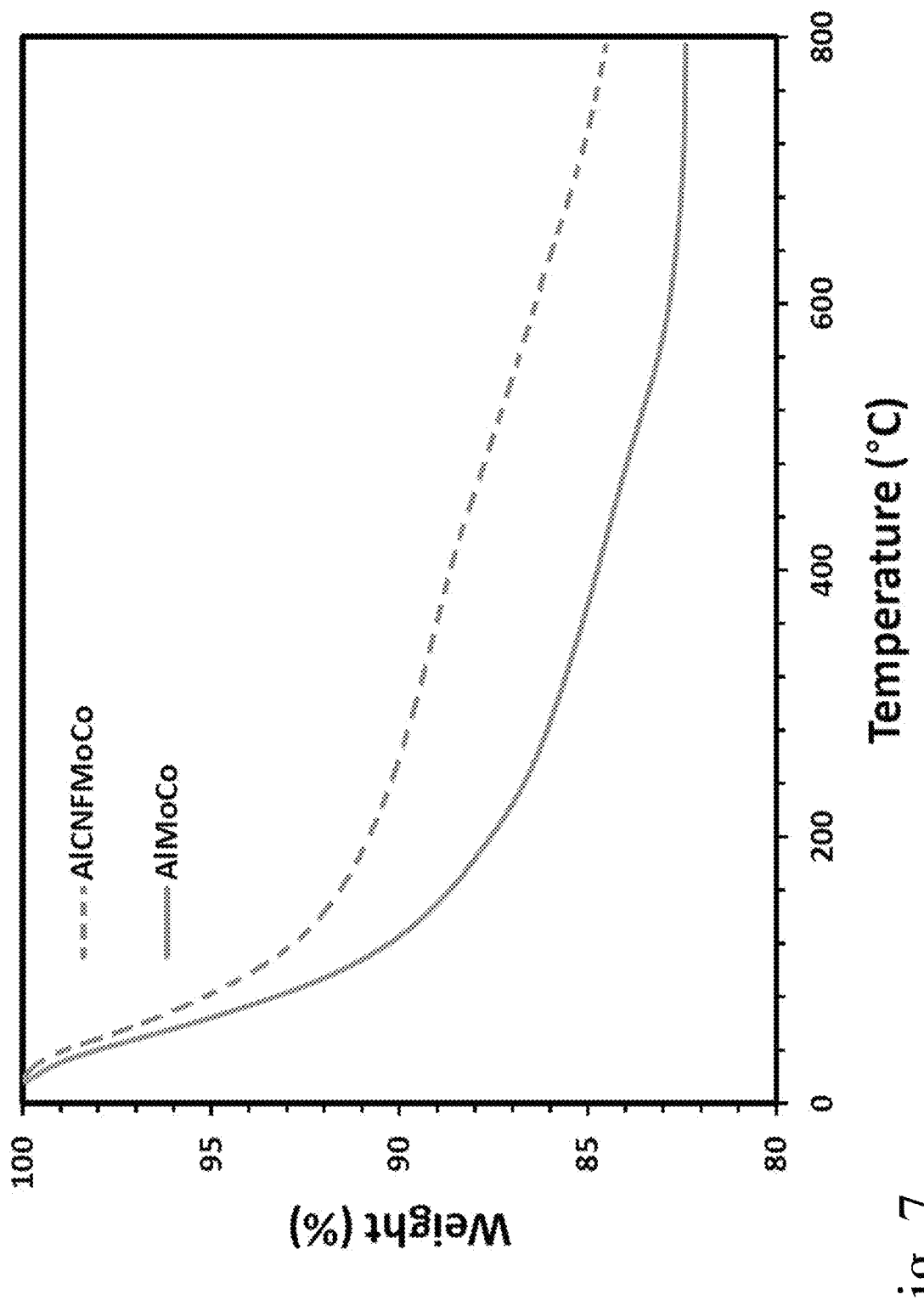
FIG. 7 shows the TGA curves of the Al—MoCo catalyst and the Al—MoCo-CNF catalyst prepared as described Example 1.

In reference to FIG. 7, thermal stability is an important factor indicative of the utility of HDS catalysts at high temperatures. The TGA curves of Al—MoCo and Al-CNF-MoCo indicate that both have a good thermal stability, and Al—MoCo's thermal stability is not affected by introducing CNF. The curves in FIG. 7 show a sharp weight loss below 250° C. for Al-CNF-MoCo (10 wt. %) and Al—MoCo (13.5 wt. %), which may be ascribed to the desorption of the absorbed moisture. The evaporation of the water molecules occurs at low temperatures, as shown in the TGA curves, since H$_2$O binding with the supports in Example 1 is weak. Most of this water is bound in an OH form which matches with the IR spectrum showing the presence of the OH group on the catalysts prepared. Remaining weight loss for both catalysts occurred in a temperature range of 250 to 750° C., associated with the decomposition of residual precursor(s). Surprisingly, according to the TGA curves, the decomposition rate of Al—MoCo is faster than the corresponding decomposition rate of Al-CNF-MoCo under the same testing conditions. FIG. 7 indicates that Al-CNF-MoCo catalysts have a unexpectedly superior thermal stability to Al—MoCo catalysts. Without wishing to be bound to any specific theory, it is believed that the unexpectedly superior thermal stability can be attributed to the presence of CNF as a co-support in the Al-CNF-MoCo catalysts.

Figure 8:
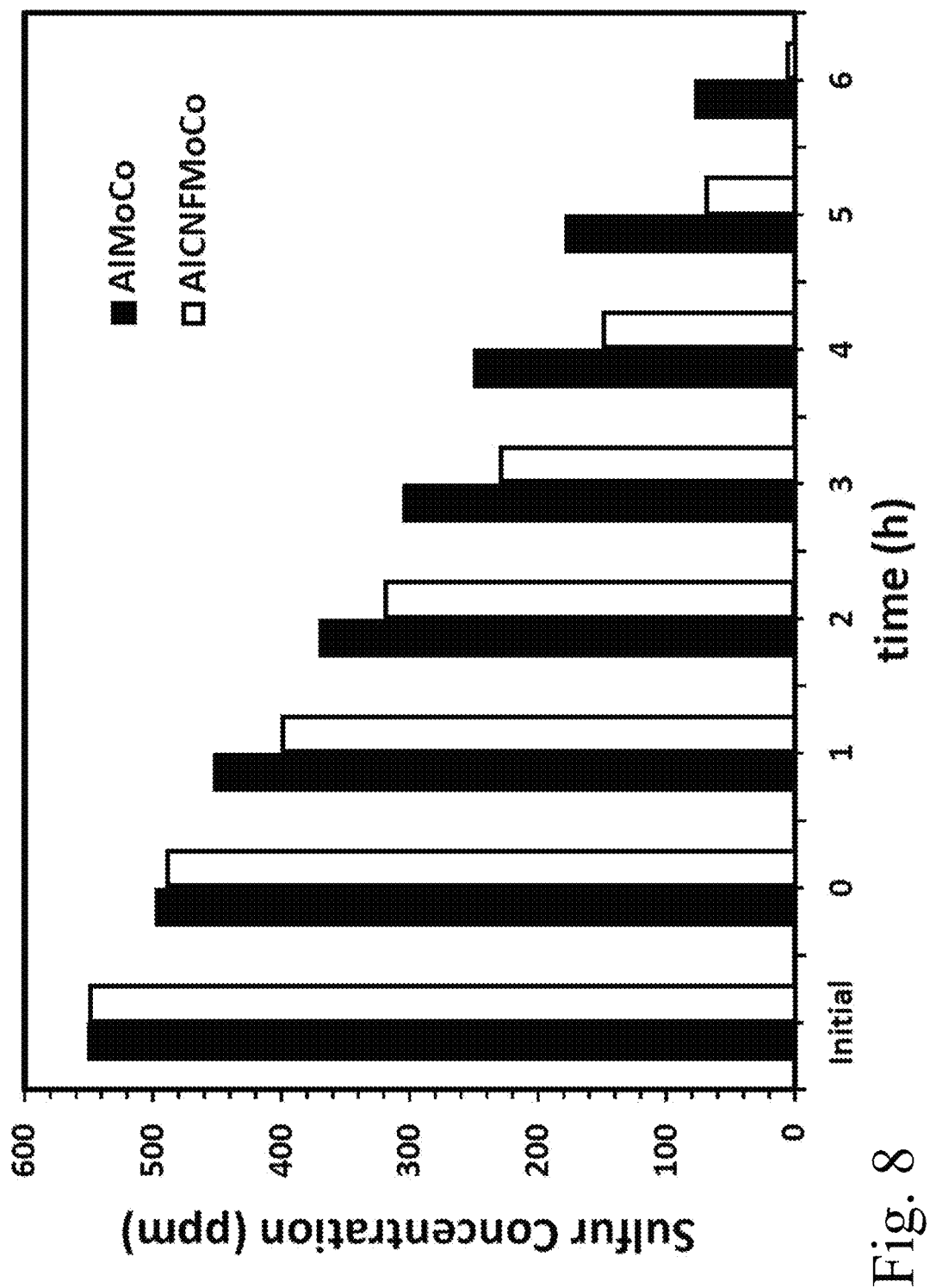
FIG. 8 shows the sulfur concentration over time for HDS reactions using the Al—MoCo catalyst and the Al—MoCo-CNF catalyst as described Example 1 using an initial sulfur concentration 550 ppm, a reaction temperature of 300° C., an $H_2$ partial pressure of 55 bar, and stirring at 180 rpm.

FIG. 8 presents a chart of sulfur removal as a function of the HDS reaction time for the catalysts from Example 1. The desulfurization reaction charted in FIG. 8 models Al-CNF-MoCo and Al—MoCo catalytic activity in HDS of a model fuel comprising dibenzothiophene (DBT) in a decalin solvent. The reaction conditions were 55 bar H2 partial pressure at 300° C. with stirring at 180 rpm, using 0.5 g of catalyst in 100 mL of the model fuel. FIG. 8 shows better catalytic performance for Al-CNF-MoCo at each reaction time interval compared to the Al—MoCo catalyst. After 6 hours of reaction at a constant temperature, 300° C., the Al-CNF-MoCo catalyst reduced the sulfur content down to ~7 ppm (~1.273% of the original 550 ppm-S), below present regulatory requirements, while the Al—MoCo catalyst desulfurized only to 78 ppm. In 6 hours reacting under similar or identical conditions, Al-CNF-MoCo catalysts within the scope of the invention may reduce the amount of sulfur, i.e., end ppm-S/original ppm-S, to no more than 15, 10, 7.5, 5, 4, 3, 2.5, 2, 1.5, 1.25, 1, 0.75, 0.5, 0.25, or even 0.1% or the original amount.

Known important factors in the catalytic activity of HDS catalysts are textural properties. HDS of DBT is believed to generally occur in mesoporous structures, i.e., containing pores with diameters between 2 and 50 nm (or macroporous structures, with pore diameters above 50 nm), rather than in microporous structures, i.e., containing pores with diameters less than 2 nm, since the DBT is a relatively large molecule. The mesoporous surface area of the Al-CNF-MoCo catalyst of Example 1 was 177 m$^2$/g, while that of the Al—MoCo catalyst was 154 m$^2$/g at the same metal loading, which indicates that the increase in the surface area could be due to the CNF-doping. Typically useful mesoporous surfaces areas of CNF-modified may be in a range of from 155 to 200, 160 to 190, 165 to 185, or 170 to 180 m$^2$/g, though such surface areas are not necessary to the function of inventive catalysts. The adsorption-desorption efficiency of Al-CNF-MoCo also appears better than that of Al—MoCo, as indicated by the adsorption/desorption isotherms (e.g., FIG. 2A) and the HF calculations in Table 1. Notably, CNF appears to improve the surface characteristics of γ-Al$_2$O$_3$ support, leading to a higher efficiency and/or throughput in the HDS process of Al-CNF-MoCo versus Al—MoCo catalysts. Textural characteristics, including higher surface area and/or greater pore volume, may lead to improved metal dispersion on Al-CNF supports compared to alumina supports. Improved metal dispersion on the support is indicated by the TPR analysis in FIG. 3, which metal dispersion in turn enhances the catalytic activity of the catalyst.

Figure 9:
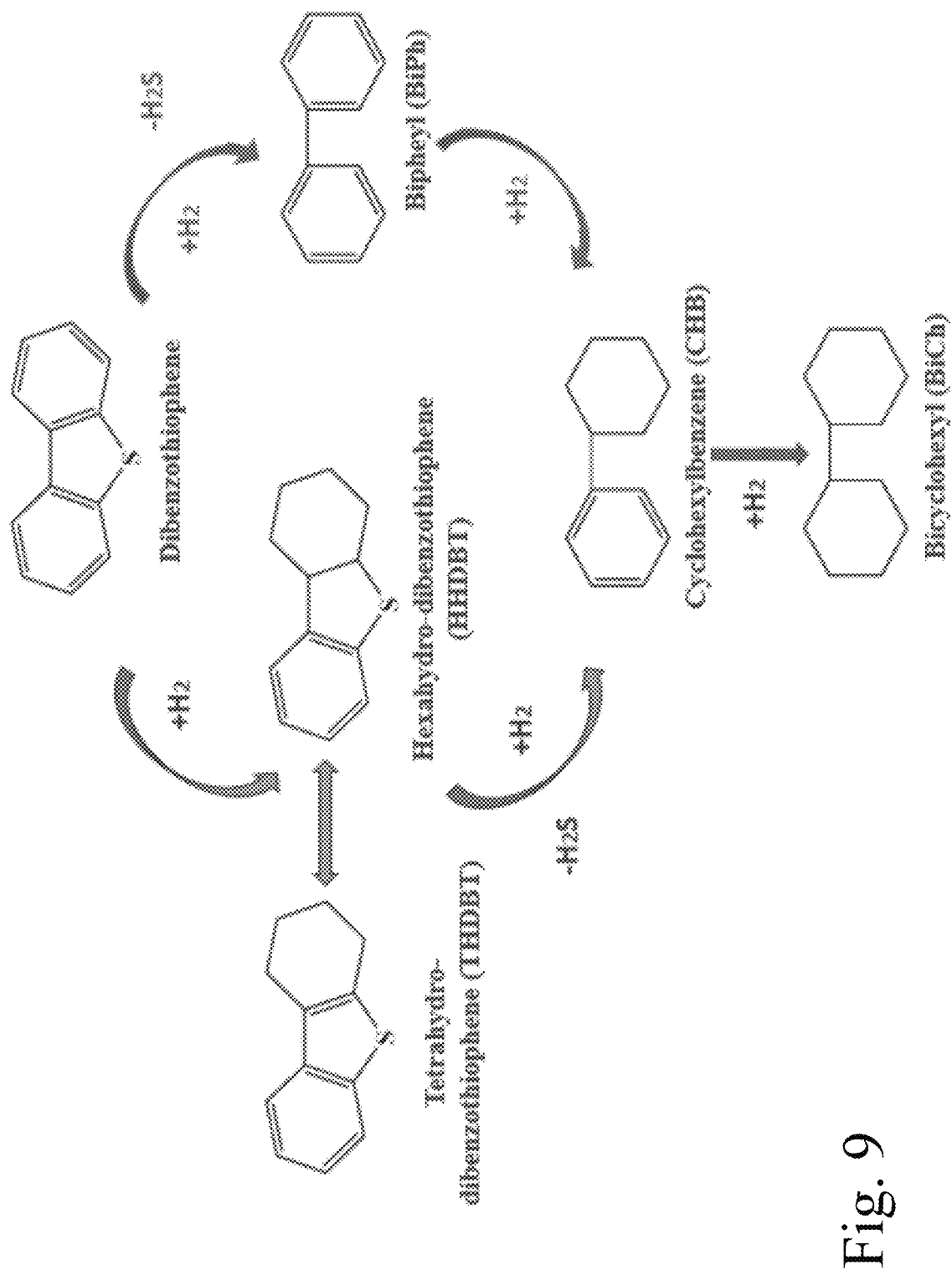
FIG. 9 shows possible pathways for the HDS of DBT at 300° C. in the presence of the Al—MoCo catalyst and the Al—MoCo-CNF catalyst prepared as described Example 1.

In reference to FIG. 9, there are two main reaction mechanisms for the HDS process of DBT, namely, the hydrogenolysis pathway (DDS) and the hydrogenation desulfurization (HYD) pathway. In the DDS mechanism, sulfur is removed by H$_2$, without reducing the DBT aromatic rings. In the DDS pathway, the removal of sulfur by direct C—S bond hydrogenolysis produces biphenyl (BiPh), which can be the predominant organic product in this pathway. Subsequently, the biphenyl can be hydrogenated to produce cyclohexylbenzene (CHB). In the HYD mechanism, the DBT aromatic rings are first hydrogenated and then the reduced compound is desulfurized. In contrast to DDS, hexahydrodibenzothiophene (HHDBT) or/and tetrahydrodibenzothiophene (THDBT) are the intermediate products of the main reaction in the HYD pathway mechanism. These HYD intermediates are desulfurized to give the same secondary product as DDS, i.e., cyclohexylbenzene (CHB). In both mechanisms, bicyclohexyl (BiCh) is formed in trace amounts, which is the result of the hydrogenation of the CHB in a slow pattern. FIG. 9 illustrates possible reaction mechanism for the HDS of DBT over the Al-CNF-MoCo catalysts.

Figure 10A:
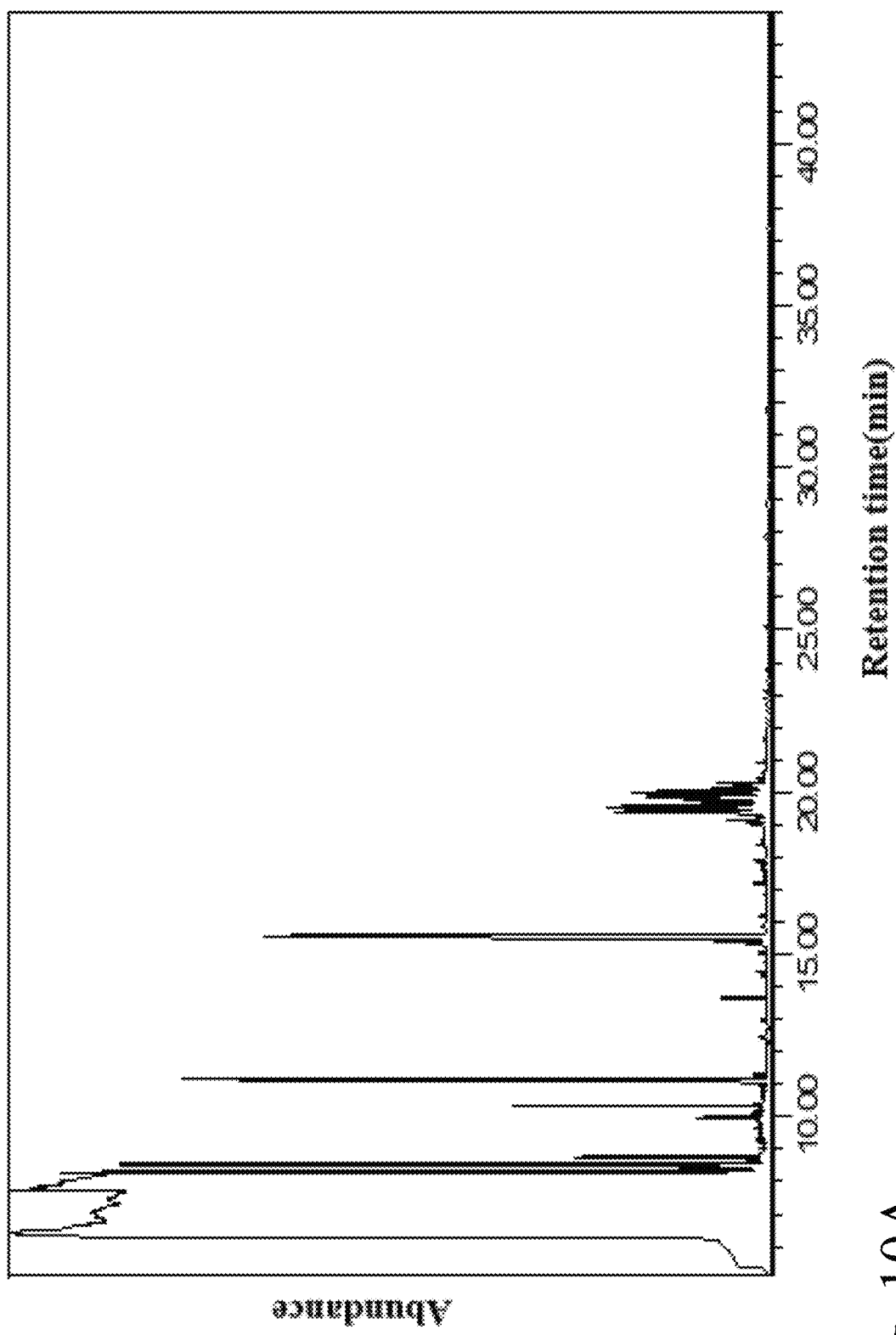
FIG. 10A to C show (a) a gas chromatogram of HDS of DBT over the Al—MoCo-CNF catalyst prepared as described Example 1, (b) the GC-MS spectrum of fragments corresponding to biphenyl HDS product, and (c) the GC-MS spectrum of fragments corresponding to the bicyclohexyl HDS product.
Figure 10B:
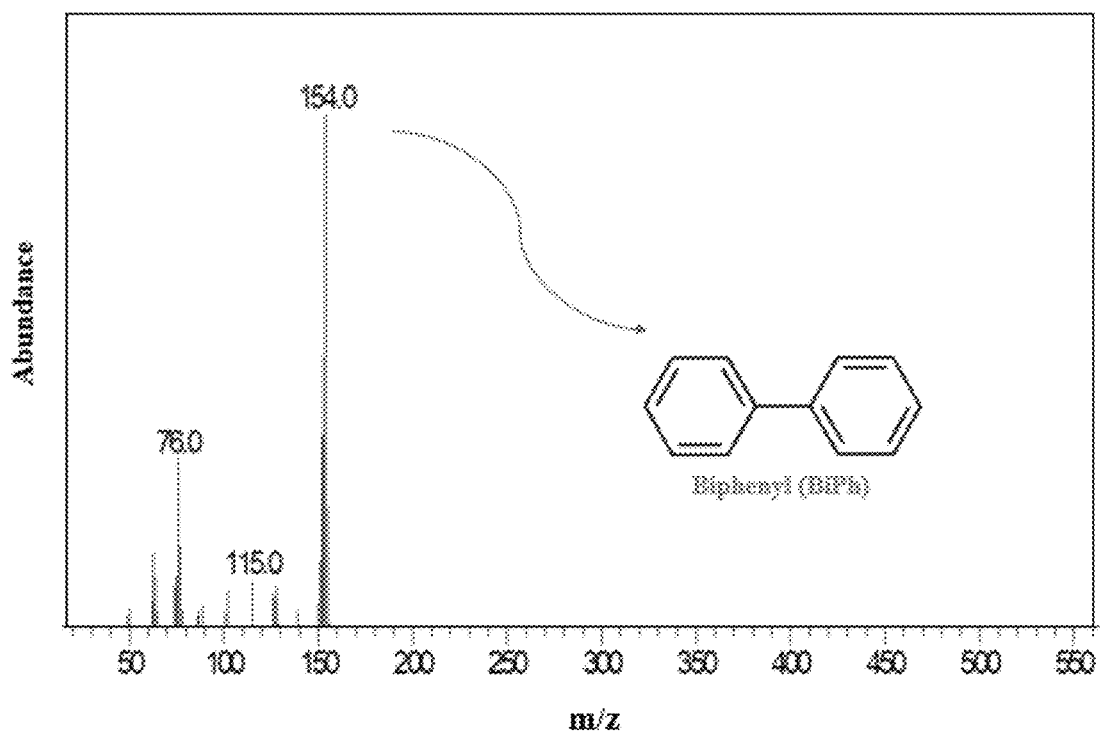
Figure 10C:
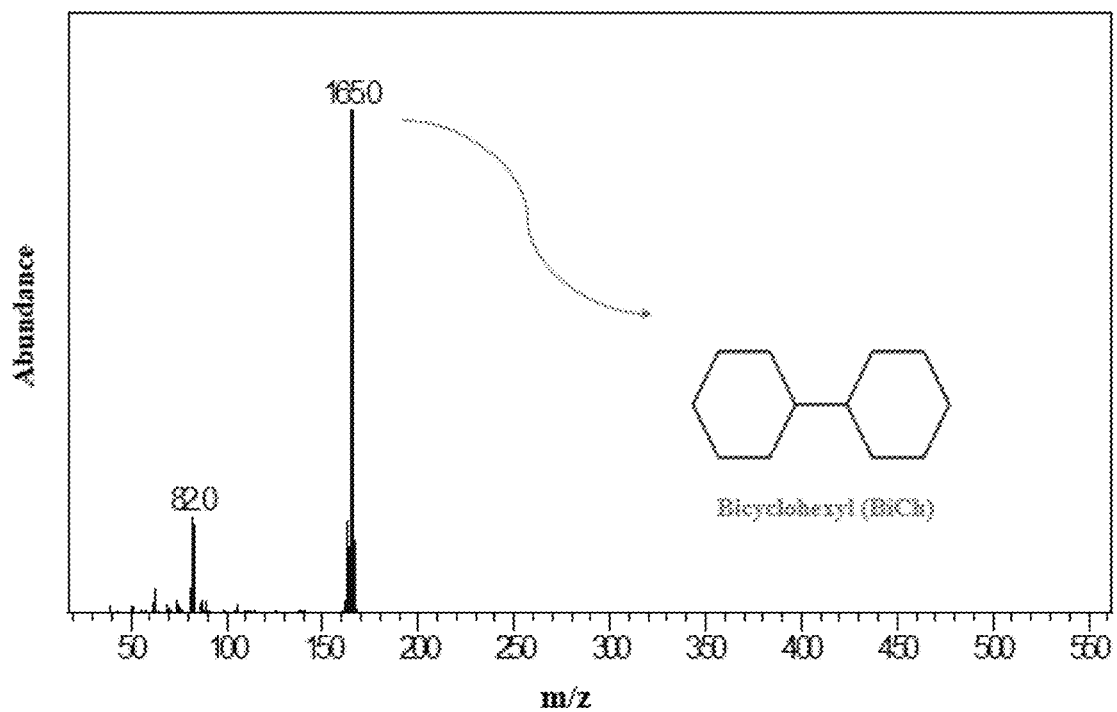

In reference to FIG. 10A to C, GC-MS was conducted on reaction mixture samples to analyze the mechanism of the HDS over the Al-CNF-MoCo catalyst. Peaks corresponding to the HDS of DBT are shown in FIG. 10A. The GC-MS peaks for the HDS products shown in FIG. 10A are complex, with roughly 500 compounds are separated in every run. Mass spectra of two peaks, respectively corresponding to biphenyl and bicyclohexyl, are shown in FIGS. 10B and C. The results in FIG. 10A to C indicate that HDS over the Al-CNF-MoCo catalysts follow a DDS reaction mechanism.

Figure 11A:
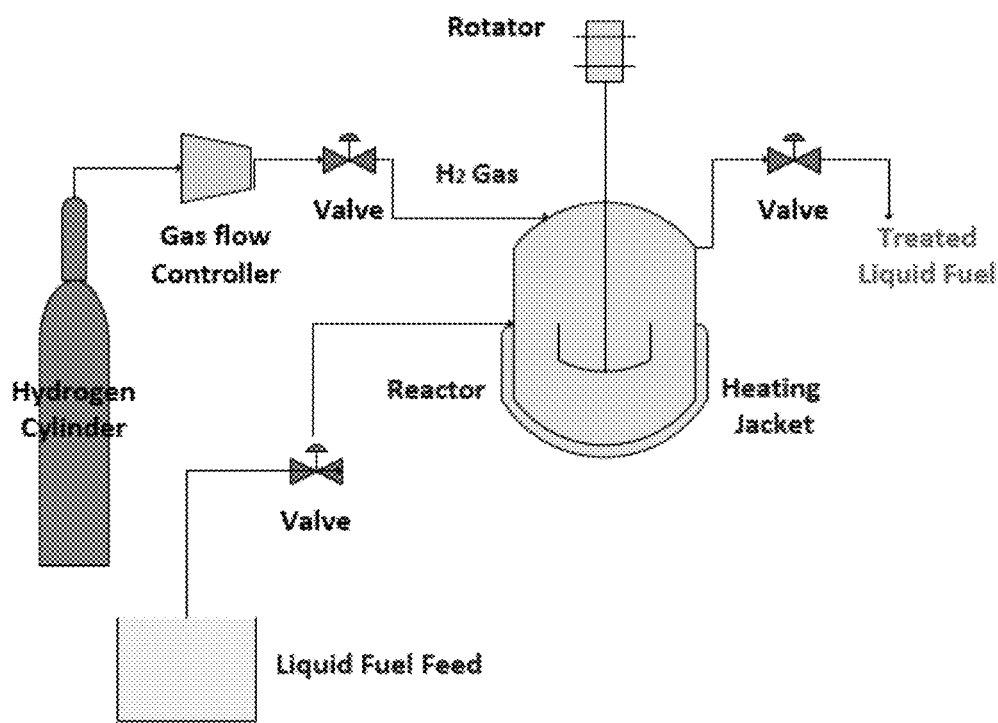
FIGS. 11A and B show HDS reaction process designs suitable for practicing aspects of the invention.
Figure 11B:
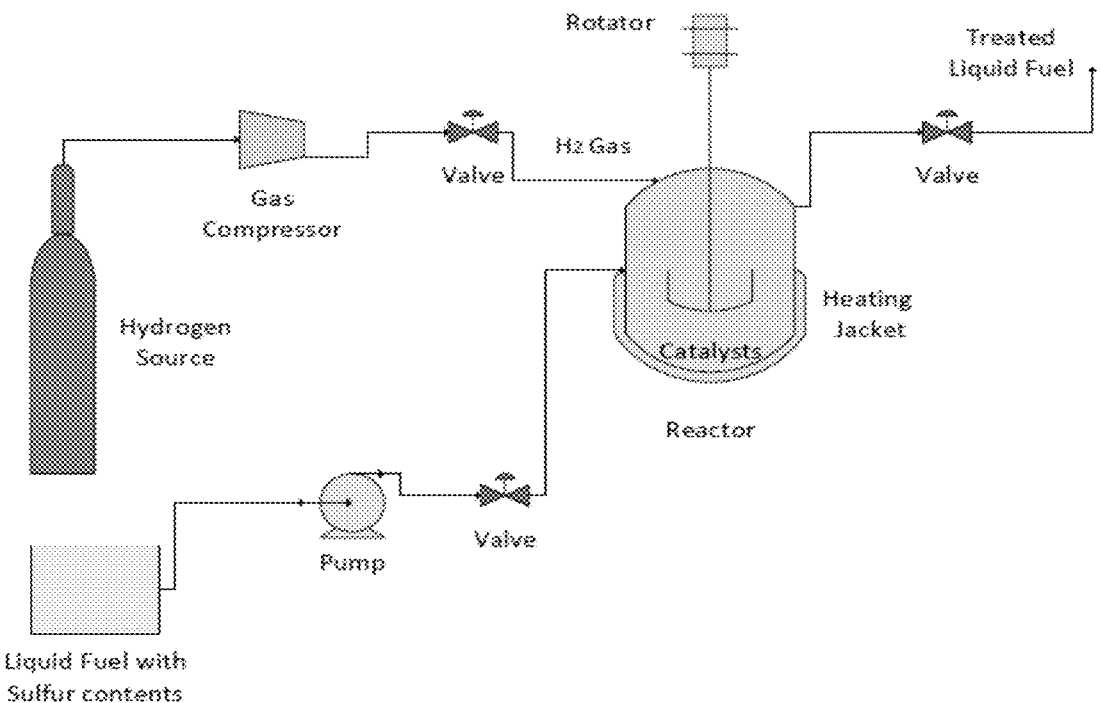
Figure 12:
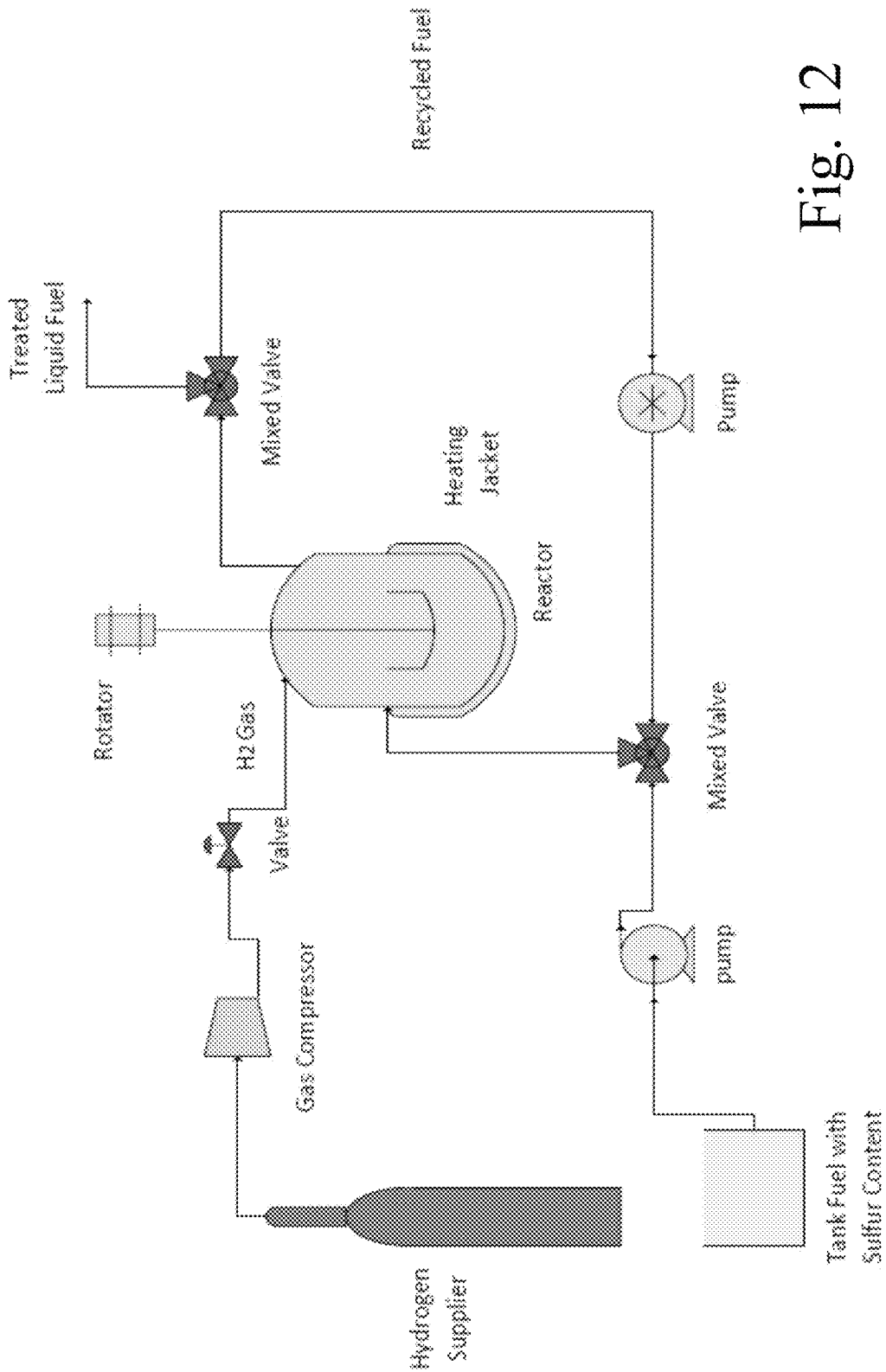
FIG. 12 shows an alternate HDS reaction process design, including a recycle system, suitable for practicing aspects of the invention.

FIGS. 11A and B show an exemplary HDS reaction system, which may include one or more reactors, hydrogen gas suppliers, pumps, gas compressors, valves, and/or fuel tanks. Liquid fuel with sulfur content may pumped into the reactor, containing the HDS catalysts, and known arrangements may be alternatively or additionally used for gaseous and/or fluidized fuel(s). Hydrogen gas (H$_2$) is injected into the reactor at a desired flow rate or partial pressure. The fuel and hydrogen flow rates may controlled using the valves, and the reaction temperature may be adjusted, e.g., increased, using a reactor heating jacket or other known heating and/or cooling units. The reaction mixture may stirred, shaken, or otherwise agitated in the reactor, e.g., by an overhead rotator, to ensure good contact with the catalysts. Optional baffles and various stirring shapes are not show for simplicity, though these may be chosen freely (e.g., hook, bowtie, paddle, dual paddle, ribbon, turbine vortex, umbrella type, flat turbine type, anchor, spiral propeller, ruvastar cyclo, dispersing homogenizing, open, high shear reverse flow, and/or high shear homogenizer type blades may be useful, as may be, on relatively small scales, magnetic stirrers) based upon the viscosity and/or mixing requirements of the reaction mixture. The HDS reaction generally occurs at high temperature and pressure in a controlled and/or closed environment. The treated fuel may be subsequently withdrawn from the reactor. A recycle line may be added to the HDS system, as shown in FIG. 12. Some the reactor outputs can be separated and recycled to the reactor by mixing or distributed valves. A goal of the recycle line may be to have a more dynamic system which allows the desirable levels of sulfur removal from the fuels, particularly liquid fuels.

The results of the hydrodesulfurization (HDS) reactions using CNF-modified catalysts demonstrates that doping alumina with carbon nanofiber may enhance the desulfurization of dibenzothiophene relative to Al—CoMo, using an Al-CNF-MoCo catalyst as described herein. BET analysis of Al-CNF-MoCo catalysts indicates that introducing CNF as a co-support can enhance certain textural characteristics of MoCo catalysts, including the surface area, pore size, and the HF factor. These influenceable textural characteristics indicate potential to enhance catalytic efficacy. Thus, Al-CNF-MoCo catalysts within the scope of the present invention, can reduce sulfur levels in hydrocarbon-containing fluids to below tolerated levels, even better than Al—CoMo catalysts without CNF modification, and, thus, may be useful for desulfurization on laboratory, pilot plant, and industrial scale.

Figure 13:
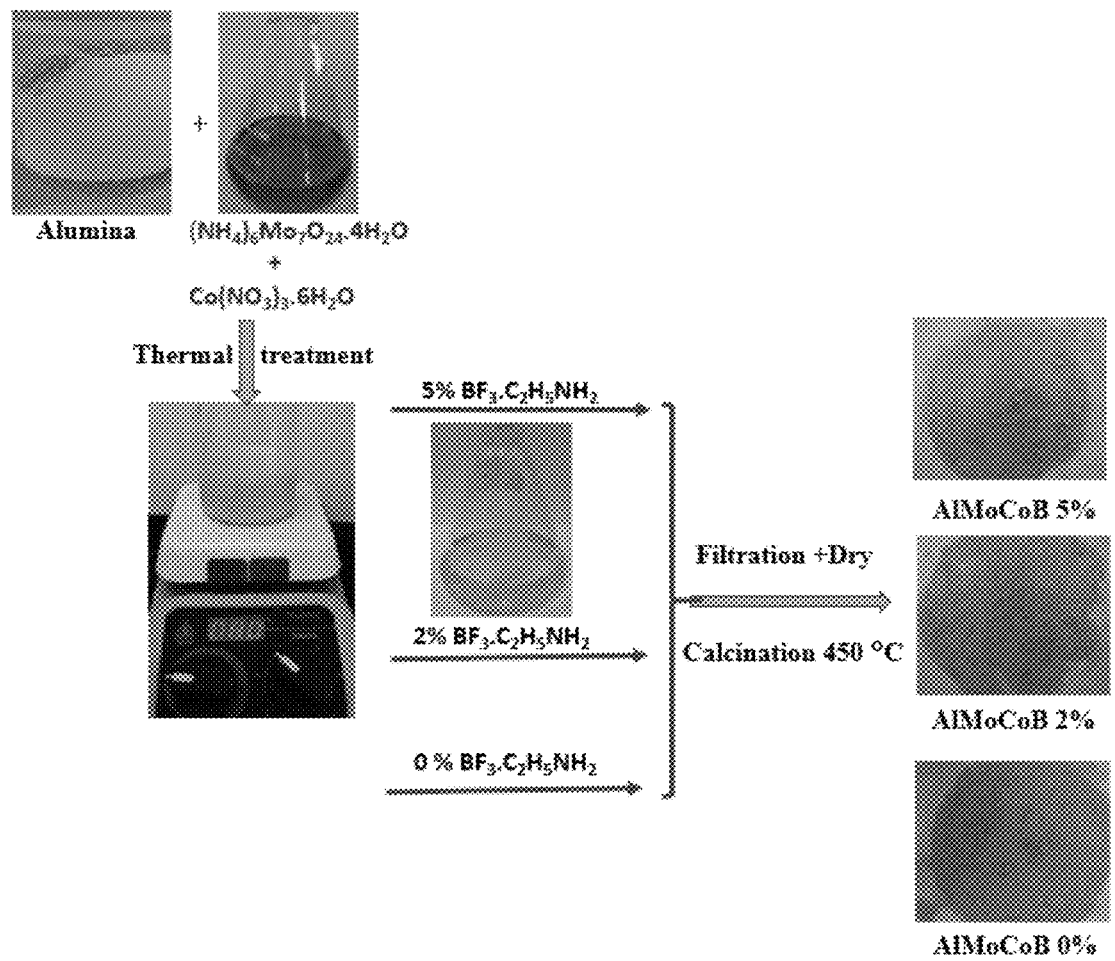
FIG. 13 shows a pictorial of synthetic steps useful in preparing boron-modified Al—MoCo catalysts, AlMoCoB0%, AlMoCoB2%, and AlMoCoB5%, within the scope of the invention.
Figure 14:
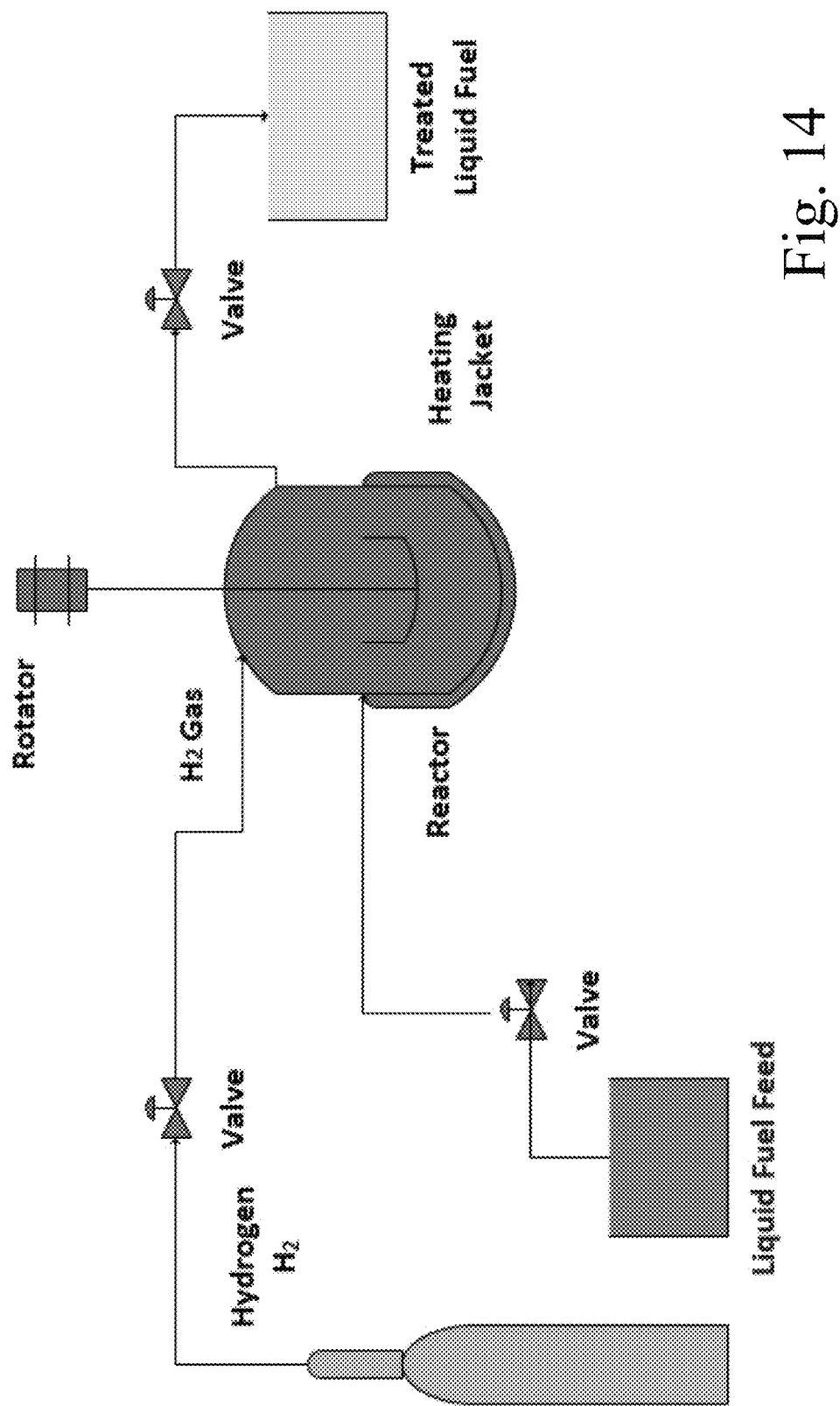
FIG. 14 shows a schematic diagram of the reaction system layout for HDS reactions conducted in Example 2.

FIG. 13 depicts a laboratory preparation of boron-modified MoCo-on-alumina HDS catalysts, which is detailed below in Example 2. FIG. 14 shows a setup for evaluating HDS activity of the catalysts using a batch reactor from Parr Instrument Company, Model 4848B, as implemented herein for HDS experiments in Example 2.

Figure 15:
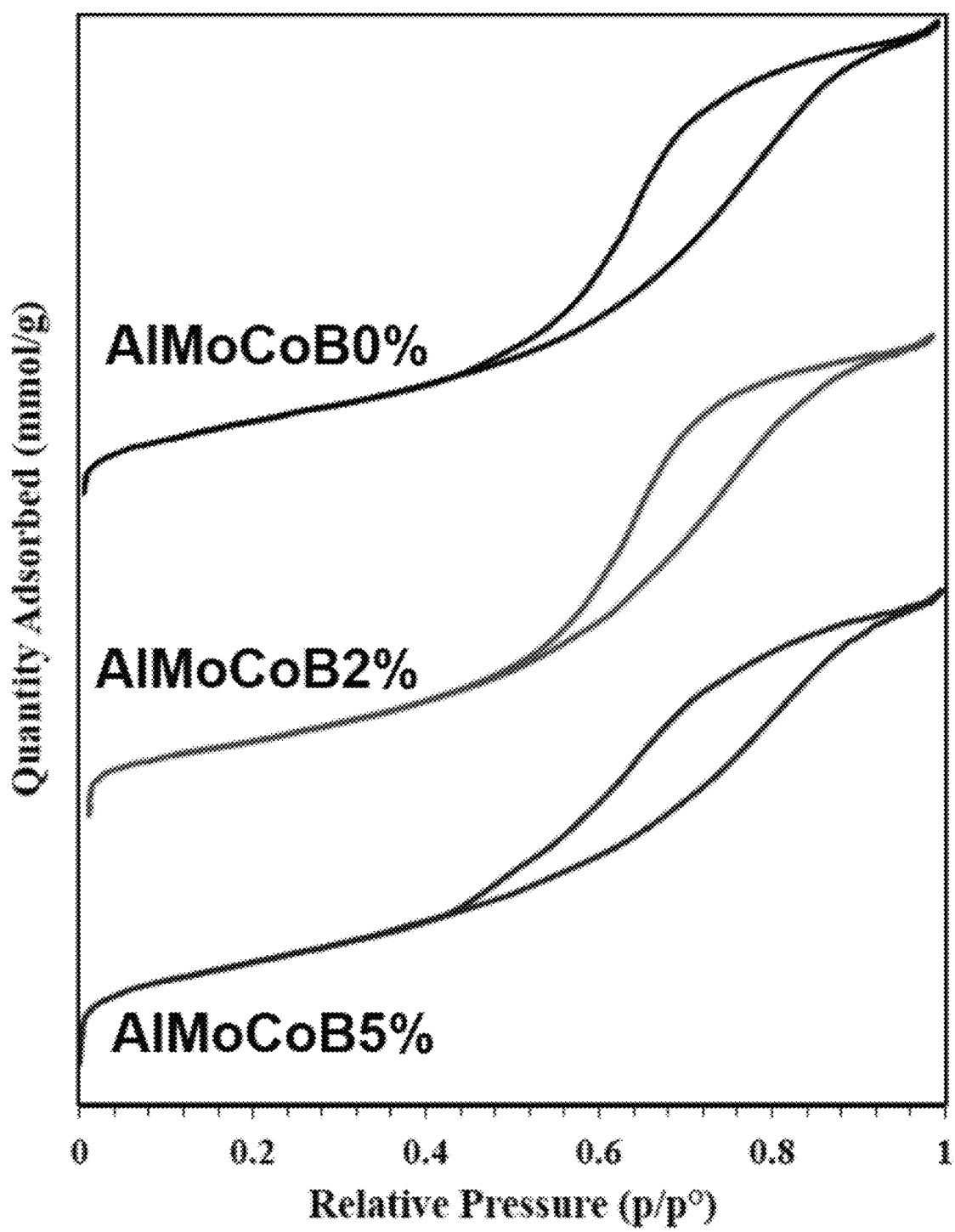
FIG. 15 shows BET surface area plots for (a) the AlMoCoB0% catalyst, (b) the AlMoCoB2% catalyst, and (c) the AlMoCoB5% catalyst as described in Example 2.

FIG. 15 discloses the physical adsorption/desorption isotherms of $N_2$ at $-196°$ C. for the catalysts prepared in Example 2. Type IV isotherms are indicated for all the catalysts made in Example 2 indicating the presence of the mesoporous structures in the catalysts. Table 3, below, summarizes the textural properties of the optionally boron-modified catalysts from Example 2, including BET surface area, mesopore surface area, micropore surface area, micropore volume, total pore volume, average pore volume, and hierarchical factor (HF). In Table 3, the surface areas and micropore volume were calculated by t-plot, $d_p$ represents the adsorption average port width (4V/A) using the BJH method, and "HF" represents the Hierarchical Factor calculated using Equation 1 as above.

As seen in Table 3, the boron-doped $\gamma$-$Al_2O_3$ samples showed higher BET surface area values than the BET surface area of the unmodified sample, i.e., AlMoCoB0%. The BET surface area was observed to increase with the percentage boron, which is believed to indicate good dispersion of boron nanoparticles on the catalyst. The mesoporous surface area of AlMoCoB0%, AlMoCoB2%, and AlMoCoB5% from Example 2 were determined to be 135, 154, and 165 $m^2$/g, respectively. The mesoporous surface area can affect HDS catalytic activity, but the role of boron-modification was surprisingly found to eventually result in lesser activity, beyond 5 wt. %. Without wishing to be bound to any theory, it is believed that boron can agglomerate on the catalysts, leading to less surface area and, consequently, lower HDS performance. Surprisingly then, of the catalysts prepared in Example 2, AlMoCoB5% had the best HDS catalytic performance.

Figure 16A:
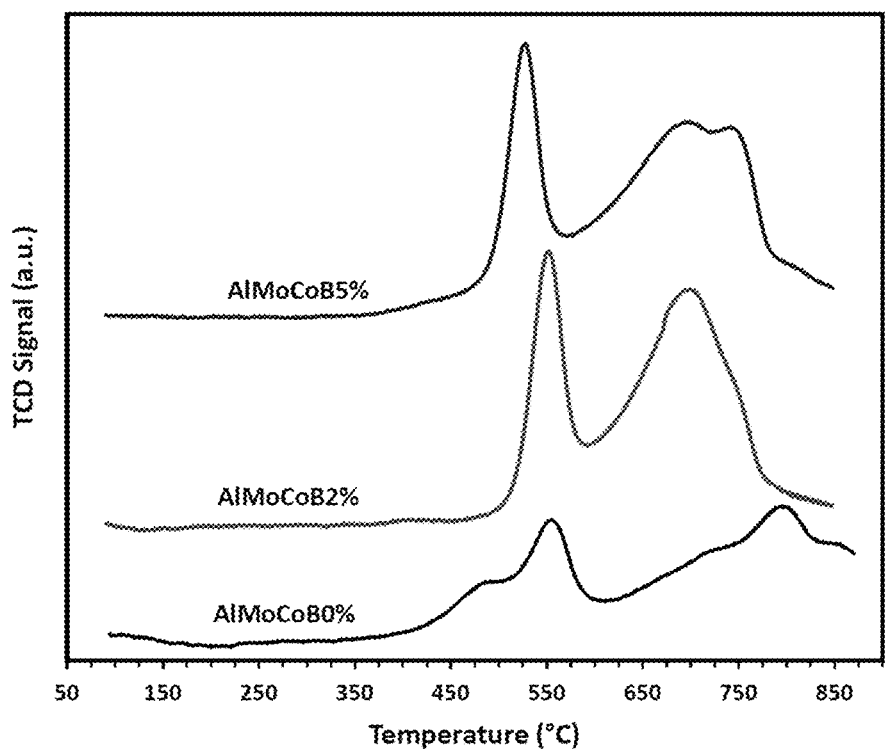
FIGS. 16A and B show (a) the $H_2$-TPR results, and (b) $NH_3$-TPD results, of the boron-modified HDS catalysts described in Example 2.

In reference to FIG. 16A, the boron-modified catalysts of Example 2 were subjected to $H_2$-TPR, i.e., temperature-programmed reduction, to study the interaction between the boron-modified MoCo species and the supporting materials. Particularly, $H_2$-TPR was used to characterize the reduction of the boron-modified MoCo species on the catalyst surface by $H_2$. FIG. 16A shows $H_2$-TPR profiles of the AlMoCB0%, AlMoCB2%, and AlMoCB5% catalysts, each having one predominant $H_2$ reduction peak within the temperature range of 525 to 560° C. and another reduction peak within the temperature range of 700 to 770° C. At a relatively low temperatures, 520 to 560° C., the main $H_2$ consumption temperature, corresponding to the $Mo^{6+}$ to $Mo^{4+}$ reduction of polymeric octahedral Mo, is observed. The reduction temperature of $H_2$ between 700 and 770° C., may be attributed to the $Mo^{4+}$ to $Mo^0$ reduction of polymeric octahedral, tetrahedral, and bulk molybdena species.

The temperature of the reduction peaks in the $H_2$-TPR profiles of FIG. 16A reflects the strength of the interaction between the active metal components and the support in the catalysts from Example 2. Increases in the reduction temperature are believed to indicate increases in the metal-support interaction, which can decrease dispersion and affect catalytic performance. As seen in Table 4, the peak locations at a low temperature of the boron-modified MoCo catalysts have the lower values than the undoped AlMoCoB0%, meaning that the boron-containing species have less strong metal-to-support interaction. Thus, boron-doped catalysts may have better metal dispersion, and better HDS catalytic activity.

TABLE 4

| Catalyst | Temp. at Peak Max. (° C.) | Quantity (cm³/g STP) | Peak Conc. (%) |
|---|---|---|---|
| AlMoCoB0% | 558 | 6 | 0.118 |
|  | 770 | 4 | 0.06 |

TABLE 3

| Catalyst | $S_{BET}$ (m²/g) | $S_{meso}$ (m²/g) | $S_{micro}$ (m²/g) | $V_{micro}$ (cm³/g) | $V_{total}$ (cm³/g) | $d_p$ (nm) | HF |
|---|---|---|---|---|---|---|---|
| AlMoCoB0% | 155 | 135 | 20 | 0.004 | 0.138 | 6.1 | 0.003 |
| AlMoCoB2% | 176 | 154 | 22 | 0.008 | 0.305 | 6.6 | 0.004 |
| AlMoCoB5% | 206 | 165 | 41 | 0.019 | 0.306 | 7.2 | 0.012 |

TABLE 4-continued

| Catalyst | Temp. at Peak Max. (° C.) | Quantity (cm³/g STP) | Peak Conc. (%) |
|---|---|---|---|
| AlMoCoB2% | 551 | 17 | 0.361 |
|  | 702 | 33 | 0.283 |
| AlMoCoB5% | 526 | 21 | 0.352 |
|  | 695 | 34 | 0.29 |

Figure 16B:
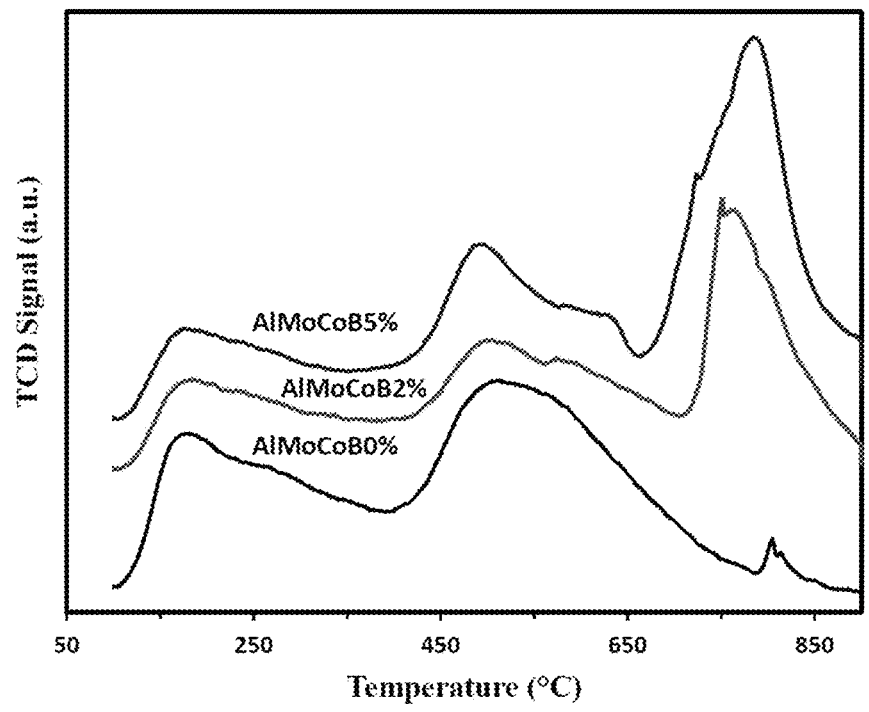

In reference to FIG. 16B, the surface acidity characteristics of catalysts prepared in Example 2 were determined by $NH_3$-temperature-programmed desorption (TPD). The acidity observed in AlMoCoB0% catalyst is moderate, characterized by Lewis acid sites in the temperature ranges of 160 to 175° C. and 490 to 520° C. The boron-modified catalysts, AlMoCoB2% and AlMoCoB5%, exhibit greater surface acidity than AlMoCoB0%, as shown in FIG. 16B and Table 5, below. The boron doping on the Al—MoCo appears to enhance the surface acidity of the catalysts, based on increased areas under the curves in FIG. 16B.

TABLE 5

| Catalyst | Temp. at Peak Max. (° C.) | Quantity (cm³/g STP) | Peak Conc. (%) |
|---|---|---|---|
| AlMoCoB0% | 173 | 4.57 | 0.011 |
|  | 513 | 5.39 | 0.0107 |
|  | 804 | 0.17 | 0.003 |
| AlMoCoB2% | 177 | 2.64 | 0.0058 |
|  | 503 | 4.03 | 0.0064 |
|  | 751 | 6.41 | 0.0188 |
| AlMoCoB5% | 175 | 2.97 | 0.0061 |
|  | 485 | 5.88 | 0.0074 |
|  | 784 | 8.28 | 0.0253 |

Figure 17A:
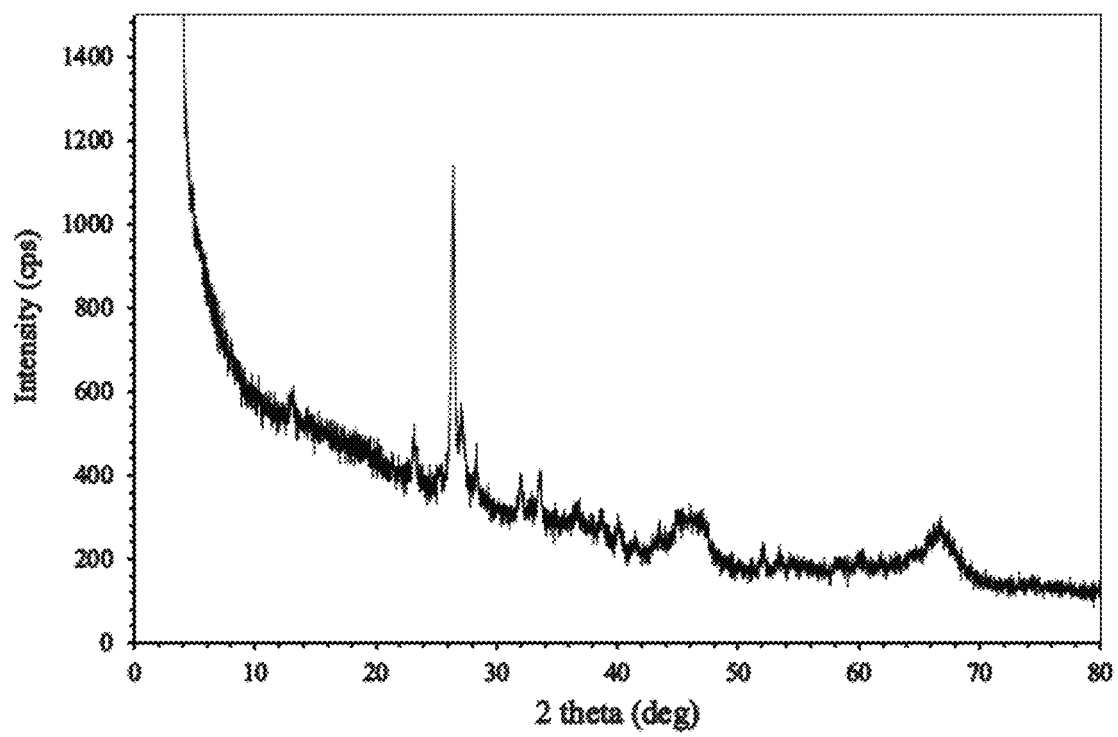
FIG. 17A to C show XRD patterns of the boron-modified HDS catalysts described in Example 2, i.e., (a) AlMoCoB0%, (b) AlMoCoB2%, and (c) AlMoCoB5%.
Figure 17B:
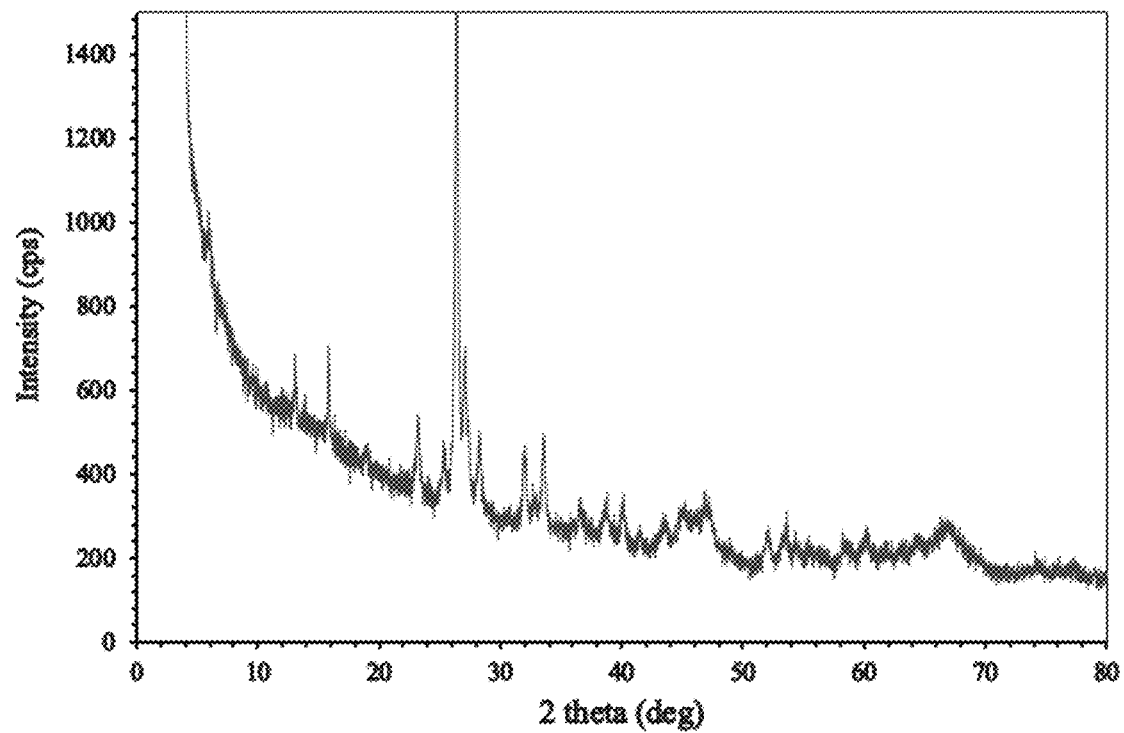
Figure 17C:
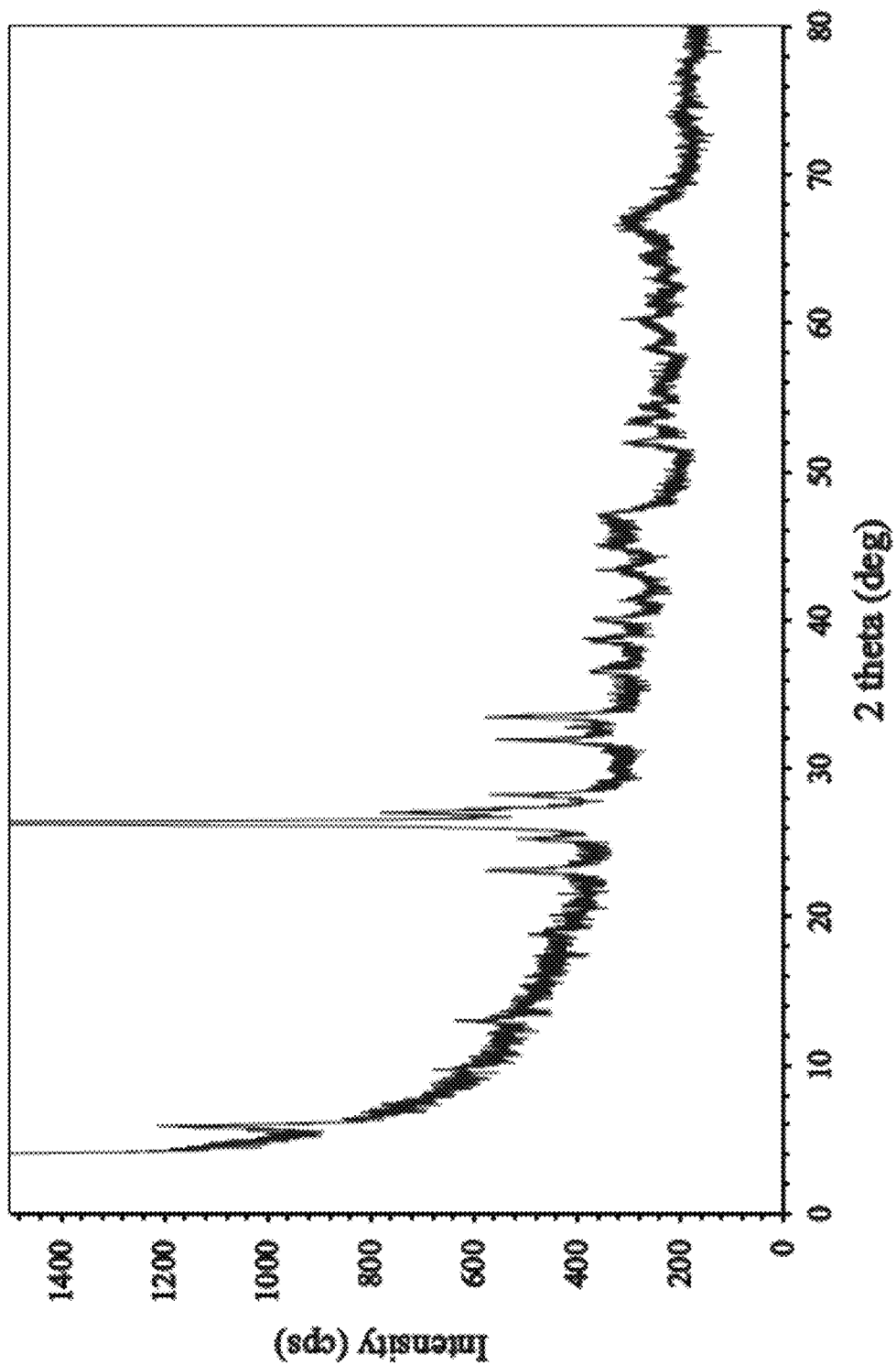

The x-ray diffraction (XRD) patterns of the catalysts prepared in Example 2 are shown in FIG. 17A to C. The XRD patterns of the AlMoCoB0% in FIG. 17A exhibits peaks at 2θ=26.6°, 45.5°, and 67.1° which arise from crystalline phases of γ-$Al_2O_3$. The XRD pattern of 2 wt. % boron-doped Al—MoCo is illustrated in FIG. 17B, and the XRD pattern of 5 wt. % boron-doped Al—MoCo is illustrated in FIG. 17C. The intensities of nanomaterial peaks (2θ=26.6°) are known to decline by metal loading. The intensities of nanomaterial peaks increase as the weight percentage (%) of boron increases on supported catalysts. FIG. 17B shows the diffraction peaks at 2θ=22.5° and 26.6° characteristic for catalysts of cobalt and molybdenum loaded on an alumina support and doped with boron with 2%. The intensities of the diffraction peak of $Al_2O_3$ (2θ=26.6°) are generally more predominant than diffraction peaks from metalloid B and metallic Co, especially for the catalysts with higher boron contents. Boron-doped Al—MoCo on alumina diffraction lines in FIG. 17C are seen at 2θ=4.5°, 22.5°, 26.6°, 45.5°, and 67.5° are attributed to the (021), (040), and (110) crystallographic planes of the orthorhombic $MoO_3$ phase. The presence of broad Mo species peak indicates a small particle size. Peaks corresponding to $Mo_3S_4$ crystallite formations at 14.4° and 32.71° could not be assigned, and peaks from molybdenum oxide species had decreased intensity. MoCo and boron indications are observable in the XRD spectra of FIGS. 17B and C for AlMoCoB2% and AlMoCoB5%/γ-Al2O3.

Figure 18:
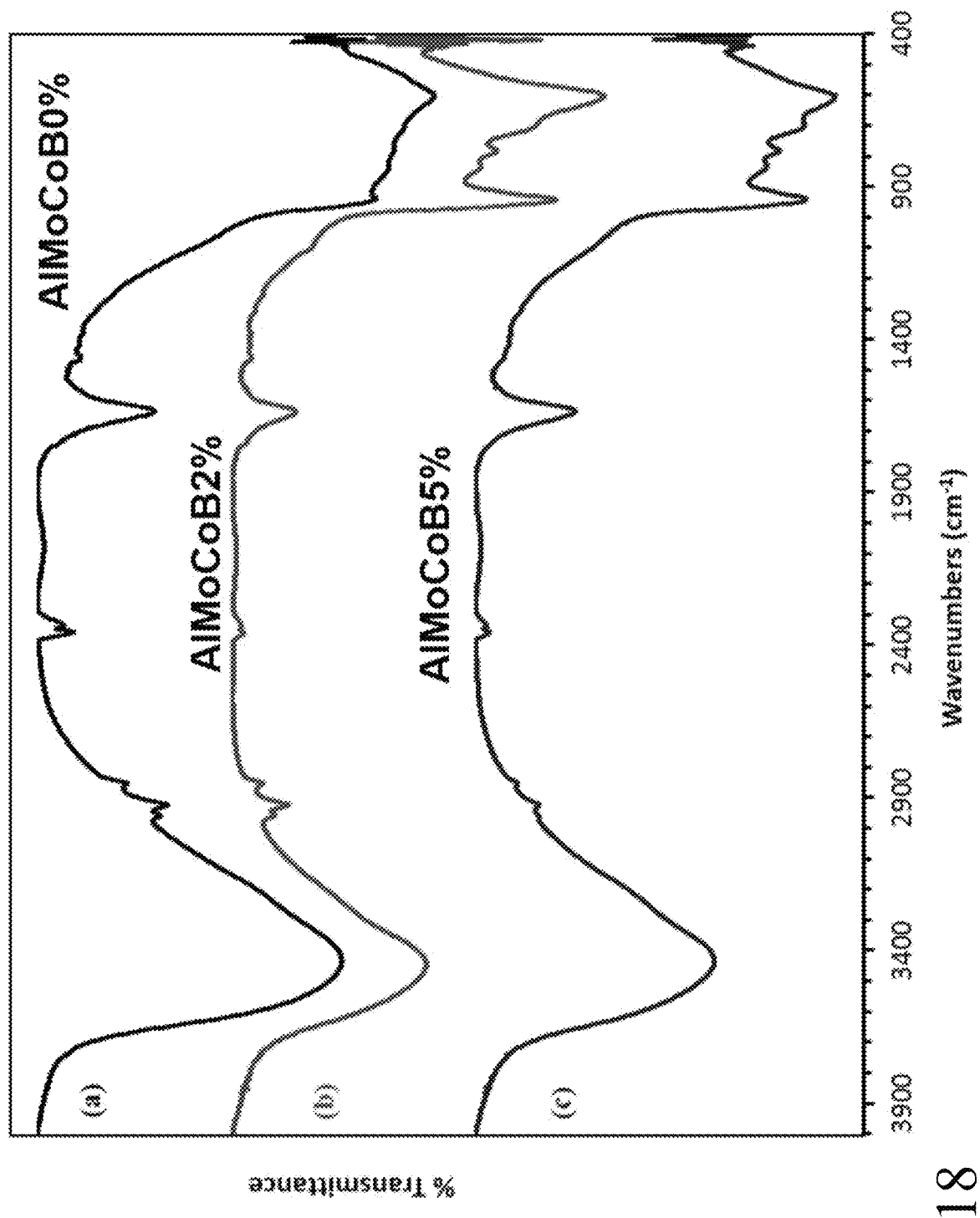
FIG. 18 shows FT-IR spectra of the boron-modified HDS catalysts described in Example 2, i.e., (a) AlMoCoB0%, (b) AlMoCoB2%, and (c) AlMoCoB5%.

FIG. 18 shows the FT-IR spectra of the boron-modified MoCo catalysts supported on γ-$Al_2O_3$ from Example 2. The spectra of AlMoCoB2% and AlMoCoB5% exhibit Al—O stretching modes at 582 $cm^{-1}$, and symmetric and asymmetric Mo=O terminal stretches at 790 and 900 $cm^{-1}$, which are known for doped boron catalysts. After doping with boron, the symmetric and asymmetric Mo=O terminal stretches in doped boron catalysts shift to greater wavenumbers, i.e., 820 and 949 $cm^{-1}$ and the intensity of the band attributed to an Al—O stretching mode is weaker.

Figure 19A:
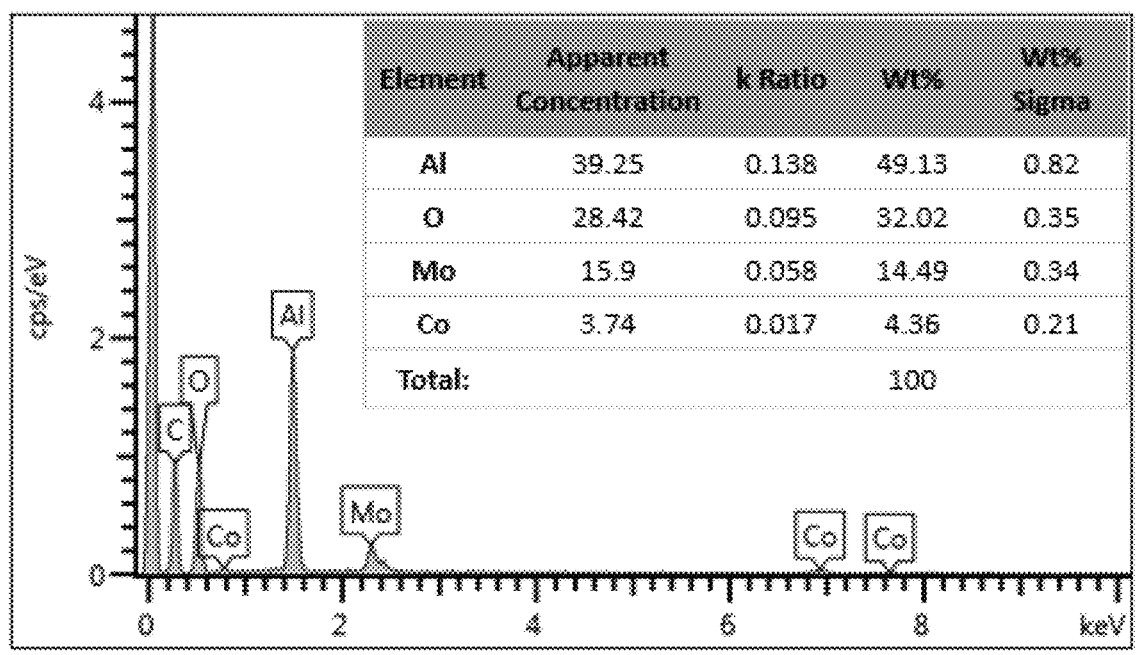
FIG. 19A to F show (a) an energy-dispersive X-ray (EDX) spectrum with an elemental analysis table of AlMoCoB0%, (b) an SEM image of AlMoCoB0%, (c) an EDX spectrum with an elemental analysis table of AlMoCoB2%, (d) an SEM image of AlMoCoB2%, (e) an EDX spectrum with an elemental analysis table of AlMoCoB5%, (f) an SEM image of AlMoCoB5%.
Figure 19B:
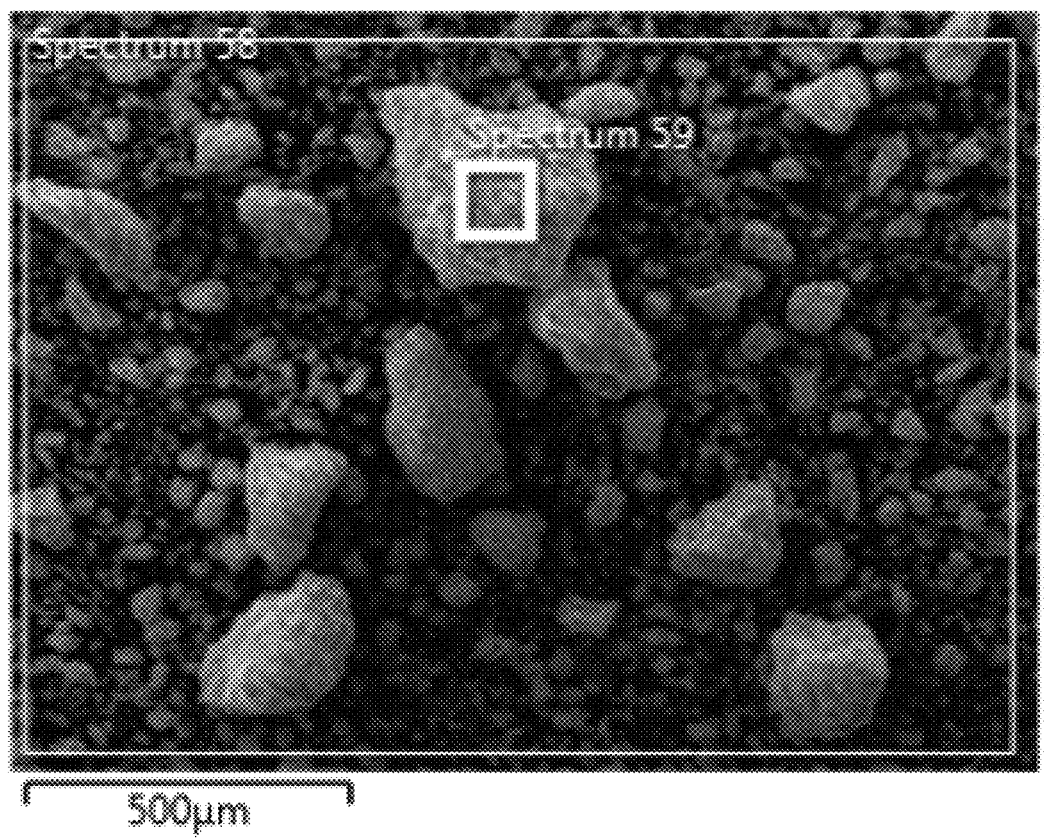
Figure 19C:
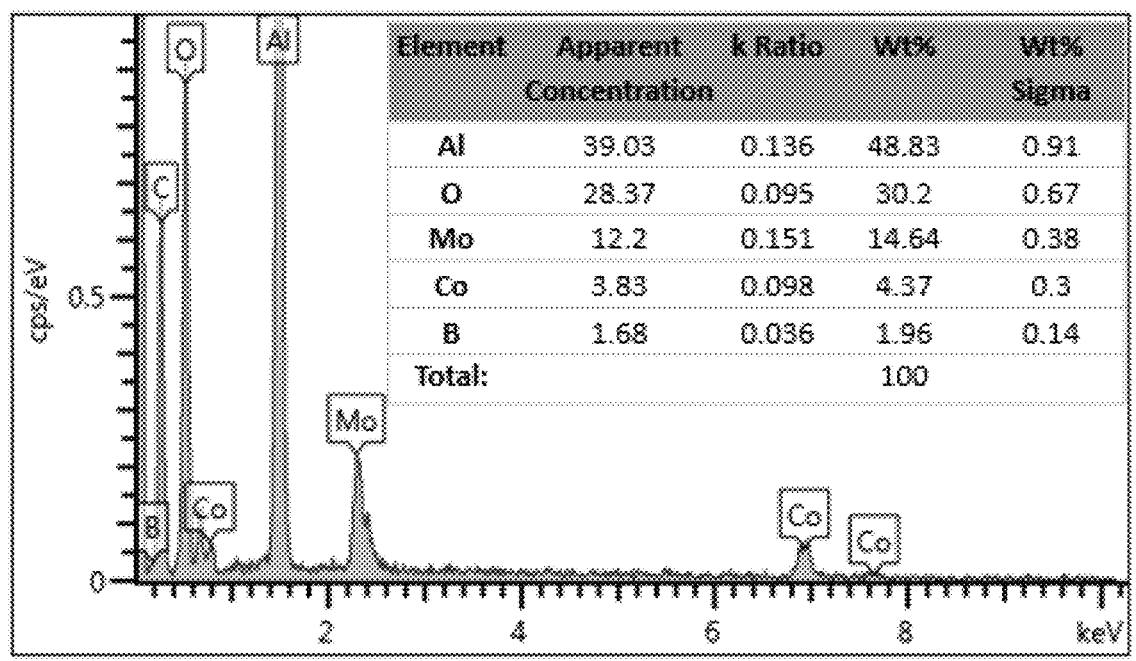
Figure 19D:
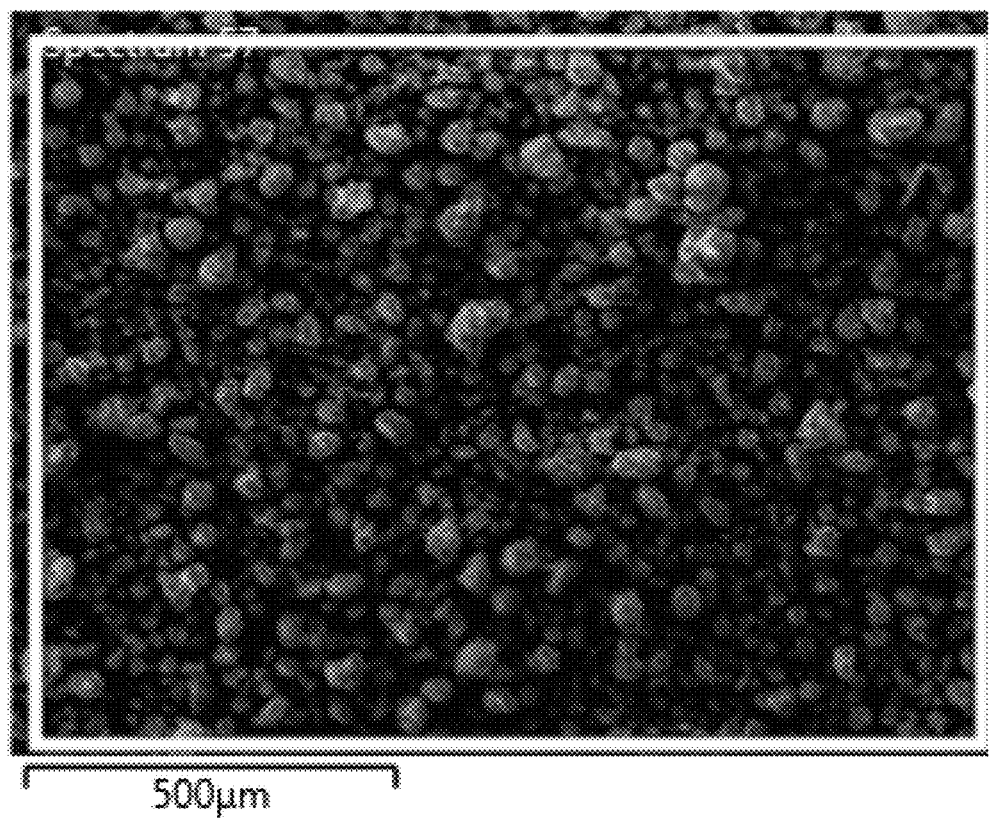
Figure 19E:
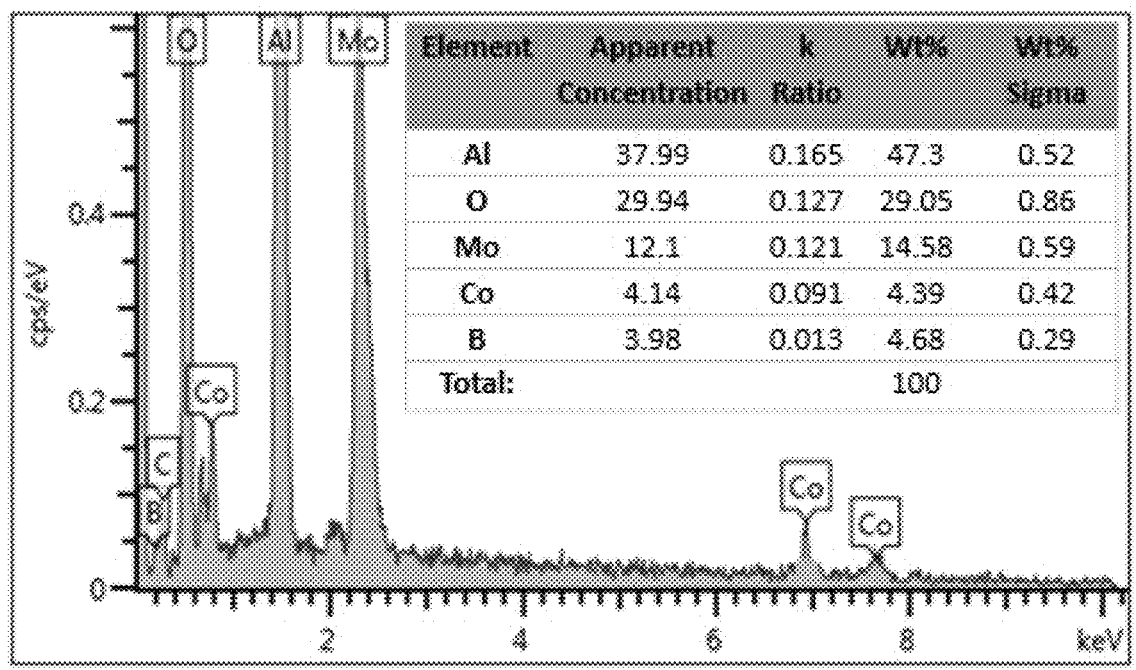
Figure 19F:
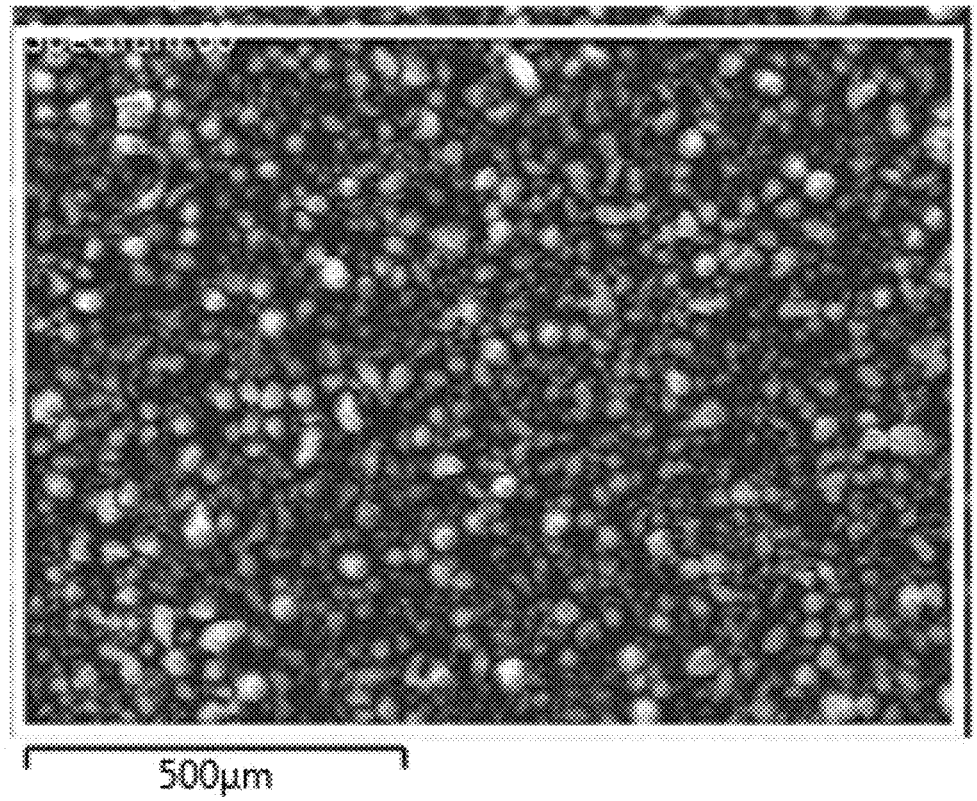

FIG. 19A to F show qualitative and quantitative characterizations of the catalysts prepared in Example 2 using EDX analysis and SEM. As seen in FIG. 19A, Mo, Co, and O were detected as the main elements in the γ-$Al_2O_3$ support, indicating a synthesis of MoCo catalysts without any other elemental impurities. In addition to MoCo, boron was detected in the boron-doped MoCo catalysts, as shown in FIGS. 19C and E, indicating successful loading of boron onto the γ-Al2O3 support in those catalyst. The quantitative reports indicate amounts of boron on the AlMoCoB2% and AlMoCoB5%, which were measured to be 1.96 wt. % and 4.68 wt. %, respectively. The chemical composition of the prepared metal catalysts was further analyzed using backscattered electron (BSE) and secondary electron (SE) analysis as seen in FIGS. 19B, D, and F, with the results being tabulated in FIGS. 19A, C, and E. As seen in FIGS. 19C and E, AlMoCoB2% and AlMoCoB5% show a boron content error of 0.14 wt. % sigma and 0.29 wt. % sigma, respectively.

Figure 20:
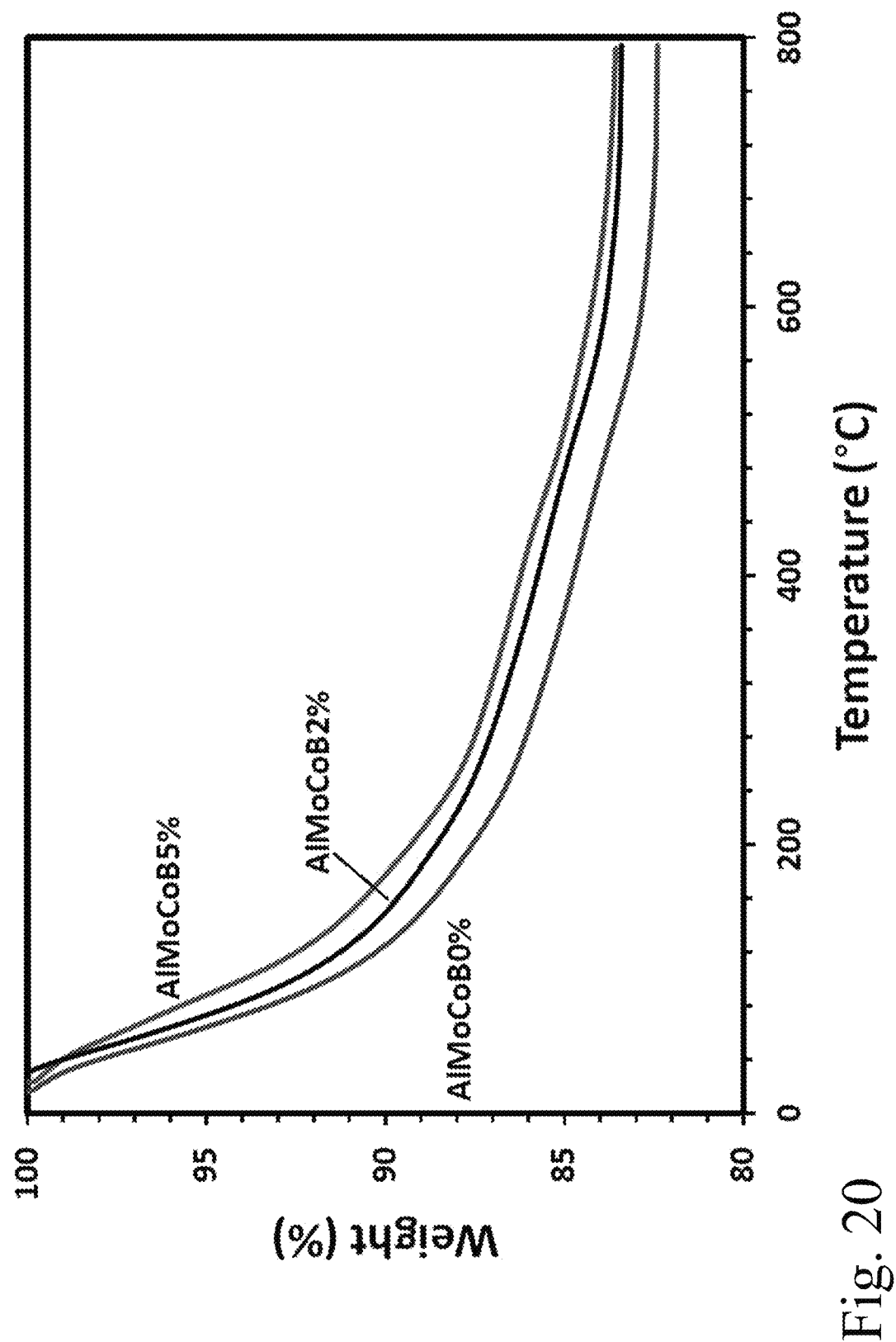
FIG. 20 shows TGA graphs of the boron-modified HDS catalysts described in Example 2, i.e., (a) AlMoCoB0%, (b) AlMoCoB2%, and (c) AlMoCoB5%.

FIG. 20 shows thermogravimetric analysis (TGA) graphs of AlMoCoB0%, AlMoCoB2% and AlMoCoB5% catalysts at a heating rate of 10° C./min, a cooling rate of 30° C., and a temperature range of 25 to 800° C. The TGA curves indicate that the main part of weight loss occurred between 25 and 250° C., for AlMoCoB5% (~12 wt. %), AlMoCoB2% (~12.7 wt. %), and AlMoCoB0% (~14 wt. %). These losses are again attributed to the vaporization of the atmospheric moisture in and on the catalysts prepared. The remaining weight loss of ~5% for each of the catalysts occurs in a temperature range of 250 to 700° C., and is associated with the decomposition of the residual precursor.

Figure 21A:
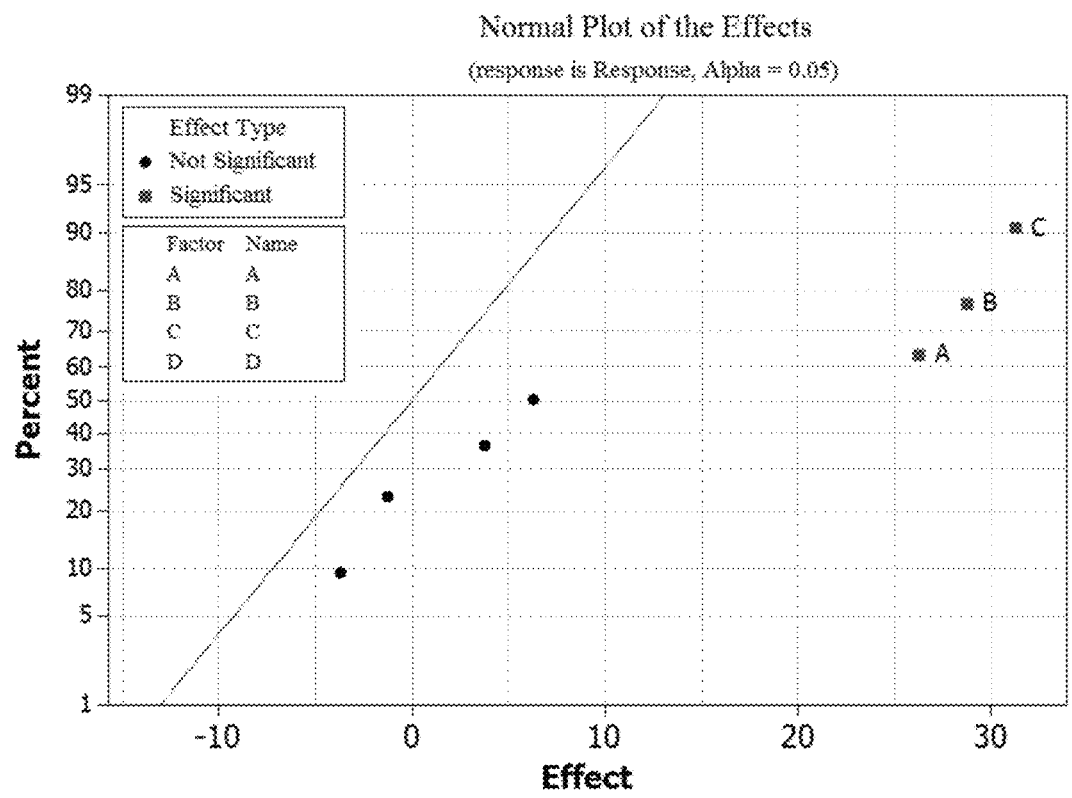
FIGS. 21A and B show (a) normal plots of effects, and (b) interaction plots, of the boron-modified HDS catalysts.
Figure 21B:
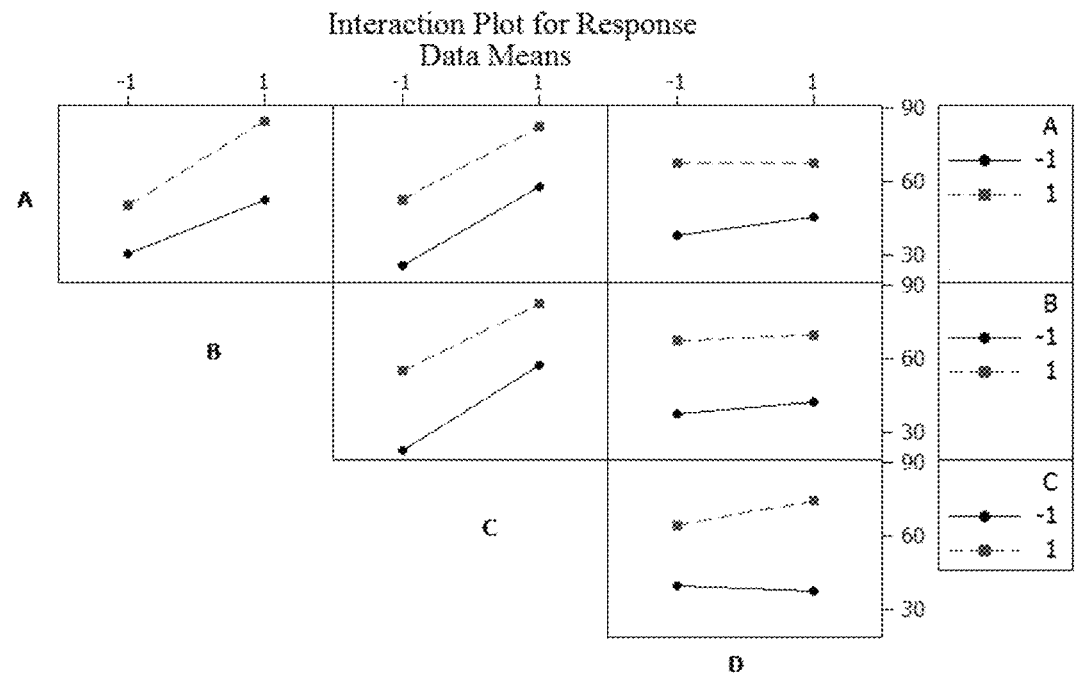

The HDS performance of the catalysts prepared in Example 2 was examined considering the parameters of temperature, pressure, dosage, and contact time. Central composite design was used to examine the influence of the parameters on the surface responses of the catalysts prepared with a >95% confidence level. Low and high levels of the parameters are shown in Table 6, and the plots obtained are depicted in FIGS. 21A and B. Normal plots of effects indicate that the temperature, pressure, and dosage are the most influential factors, as shown in FIG. 21B. By increasing the reactor temperature and pressure, the efficiency also appears to be increased. Also, the efficiency increased by increasing the dosage of the catalyst and contact time. Analyzing the combination of the range of the "low" and "high" values on the efficiency, as in FIG. 21B with the AB interaction analysis, indicates that by increasing the contact time and dosage, the performance would be increased. However, the efficiency levels off with further increase in both contact time and dosage after an optimum dosage of 0.6 g and contact time of 6 hours. Center points also appear to indicate satisfactory performance.

TABLE 6

| Variable | Low (−) | Central point (0) | High (+) |
|---|---|---|---|
| (A) Temperature (° C.) | 250 | 300 | 350 |
| (B) Pressure (bar) | 30 | 40 | 50 |

TABLE 6-continued

| Variable | Low (−) | Central point (0) | High (+) |
|---|---|---|---|
| (C) Dosage (mg) | 0.2 | 0.4 | 0.6 |
| (D) Contact time (h) | 2 | 3 | 6 |

Figure 22:
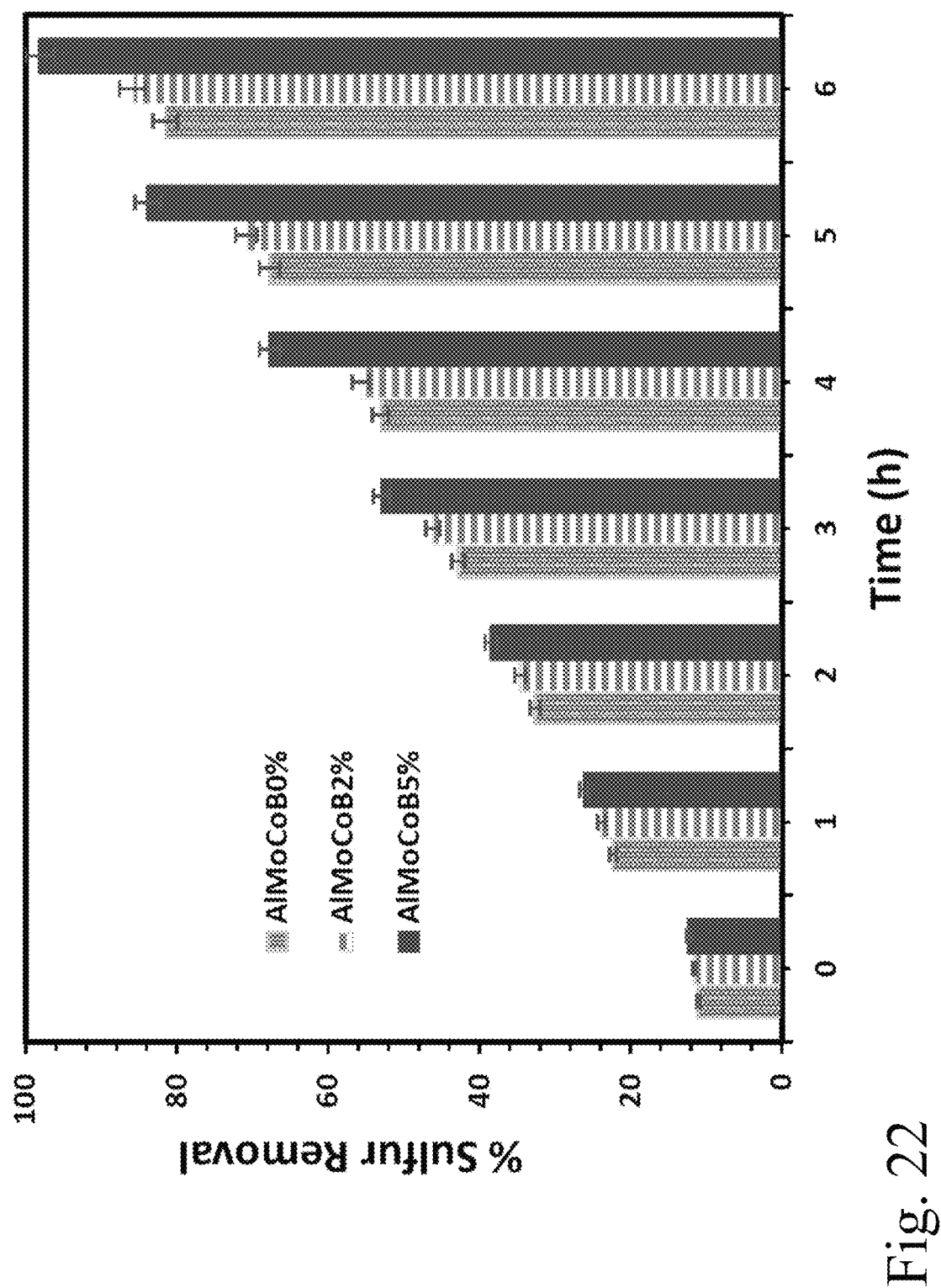
FIG. 22 shows a shows a chart of comparative catalytic performance of the boron-modified catalysts, i.e., AlMoCoB0%, AlMoCoB2%, and AlMoCoB5%, at different HDS reaction intervals under an initial concentration of 650 ppm BDT at a reaction temperature of 300° C., at 50 bar $H_2$ partial pressure, stirring at 150 rpm.

The HDS activity of the AlMoCoB0%, AlMoCoB2%, and AlMoCoB5% catalysts prepared in Example 2 are depicted in FIG. 22. In comparison, the activities of AlMoCoB0% and AlMoCoB2% were roughly same, but a significant enhancement in HDS activity was observed for AlMoCoB5%. Without wishing to be bound to any theory, it is believed that the well-crystallized AlMoCoB5% structure has fewer —OH groups on its surface, thus limiting the influence the metal-to-support interactions and allowing the creation of more CoMoS species. The enhanced stacking of sulfided Al—MoCoB layers may shield the polarization of Al ions of alumina to some extent, potentially disinhibiting Co on Mo and allowing increased formation of CoMoS species and correspondingly increasing the HDS catalytic activity. As seen in FIG. 22, the boron-modified Al—MoCo catalysts within the scope of the invention are suitable to remove at least 87.5% of all sulfur in the starting material fuel, akin to that in Example 1, within 6 hours of reaction time under the conditions described in Example 1. For example, the boron-modified Al—MoCo catalysts, particularly AlMoCoB5%, may be suitable to remove at least 90, 92.5, 95, 96, 97, 97.5, 98, 98.5, 99, 99.5, 99.9, or all detectable organosulfur by 6 hours of operation under the conditions discussed below.

Figure 23:
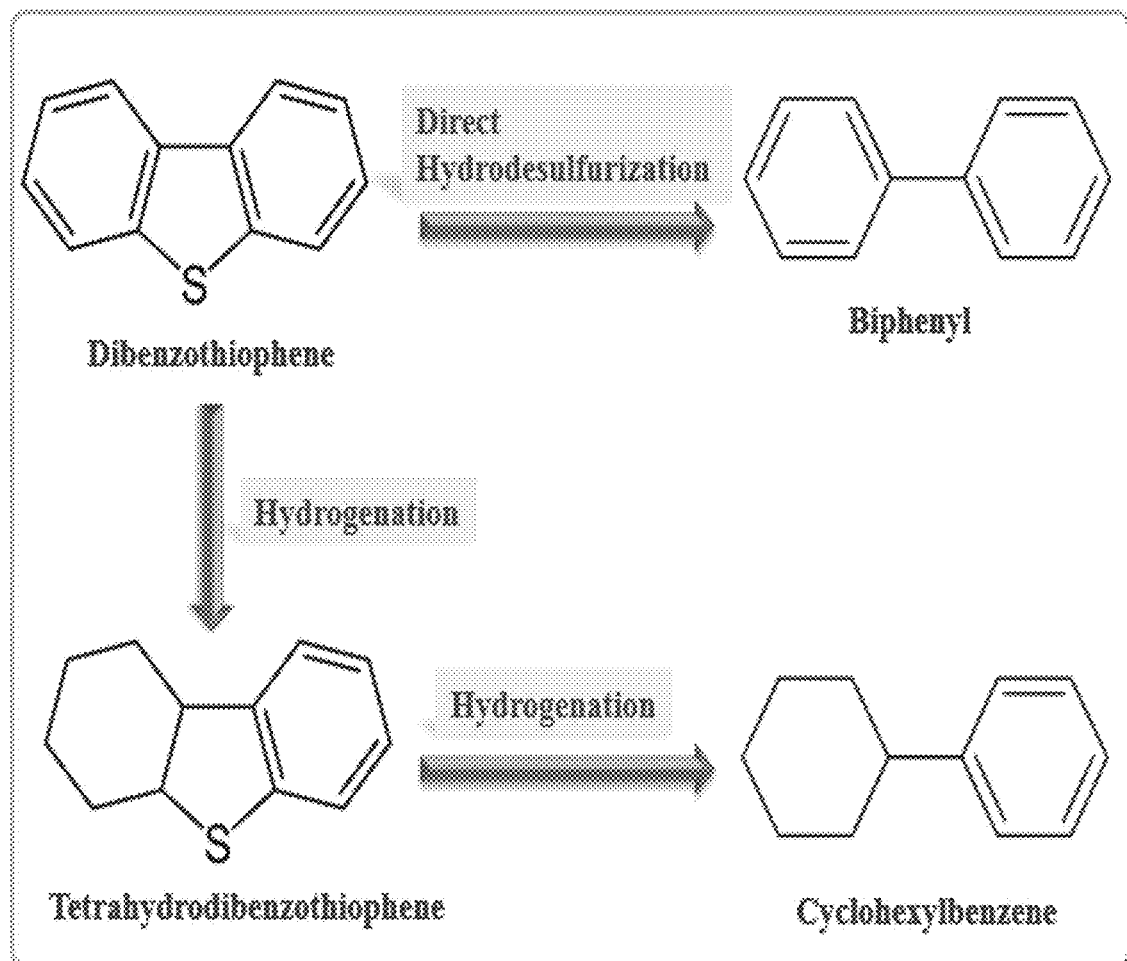
FIG. 23 shows an alternative, simplified presentation of reaction pathways for hydrodesulfurization of dibenzothiophene.

As in the case discussed for the CNF-doped catalysts, the hydrodesulfurization (HDS) of dibenzothiophene (DBT) can occur via two parallel pathways, illustrated in FIG. 23. The first pathway is the direct desulfurization or hydrogenolysis by C—S bond cleavage in a single step. The second pathway is hydrogenation in two or three steps through the hydrogenation of one of the phenyl rings followed by C—S bond cleavage. HDS of DBT via the direct desulfurization pathway yields biphenyl and $H_2S$ as the final products. However, the hydrogenation pathway results in the formation of intermediates, such as tetrahydrodibenzothiophene and hexahydrodibenzothiophene, followed by fast desulfurization to form cyclohexylbenzene. The direct hydrodesulfurization pathway consumes substantially less hydrogen. Thus, direct hydrodesulfurization is preferred.

Figure 24A:
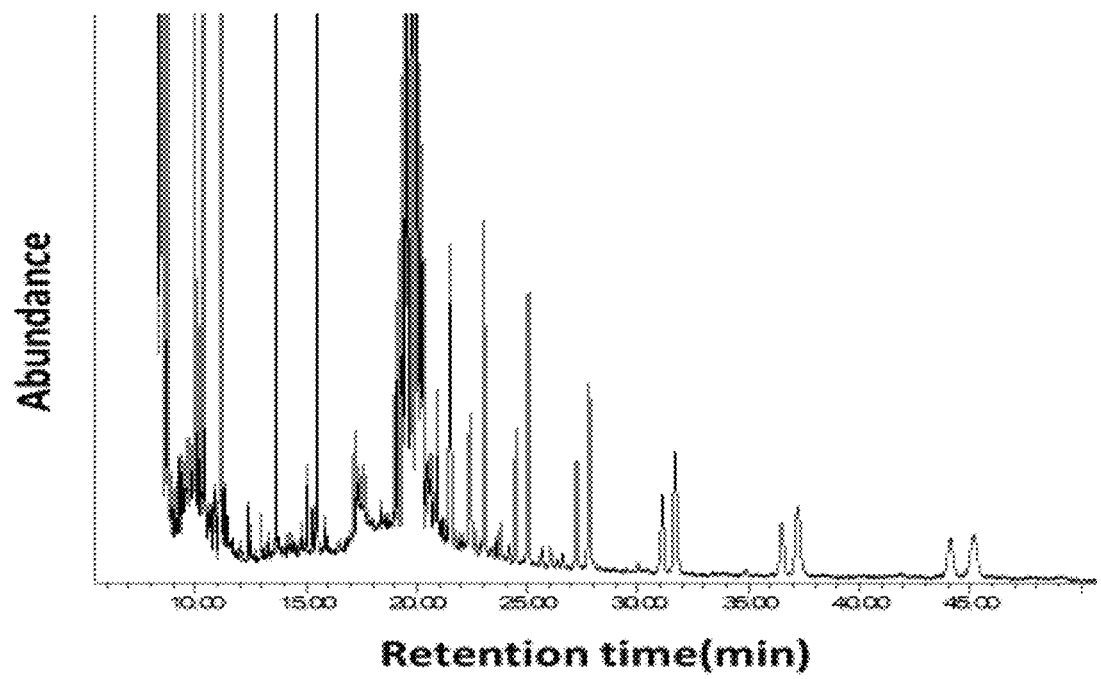
FIG. 24A to D show (a) a GC-MS chromatogram of reaction products of an HDS reaction of BDT in decalin in the present of the boron-modified catalysts from Example 2, (b) a GC-MS spectrum of the DBT starting material, (c) a GC-MS spectrum of the biphenyl HDS product, and (d) a GC-MS spectrum of the cyclohexylbenzene product.
Figure 24B:
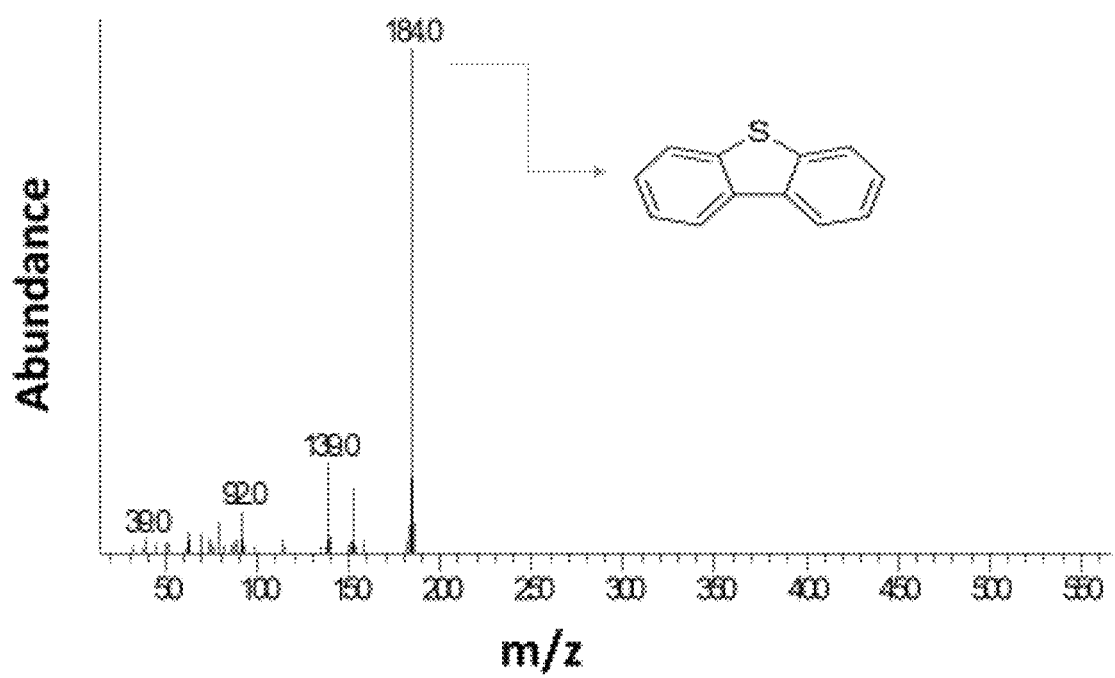
Figure 24C:
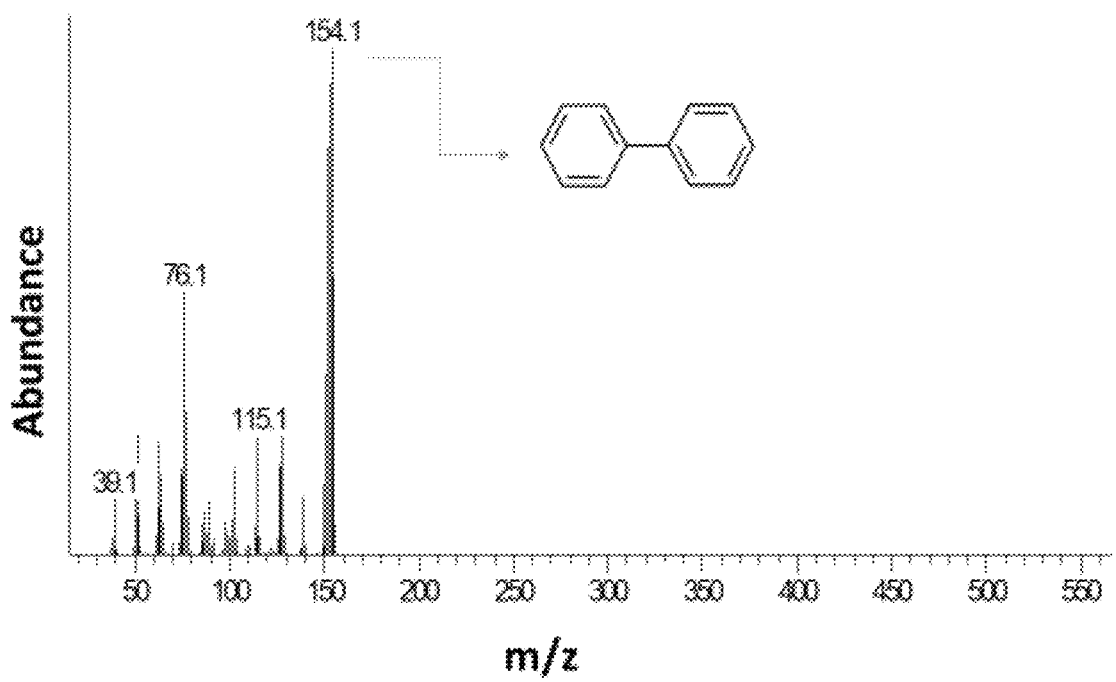
Figure 24D:
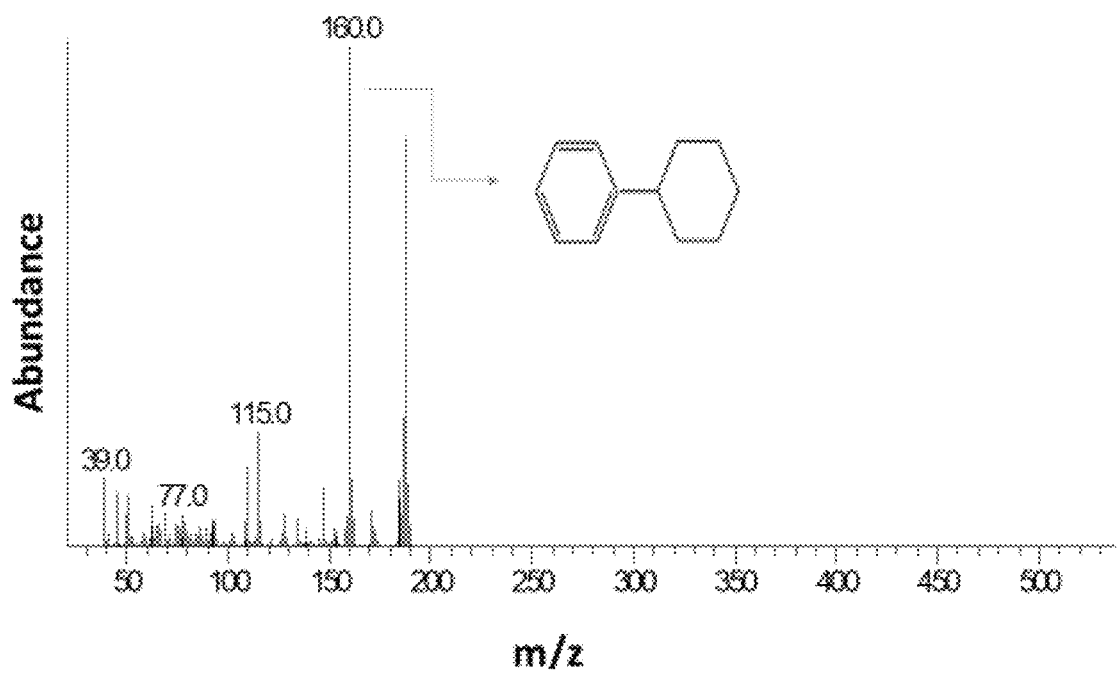

GC-MS analysis was carried out to detect the products of HDS reaction products over AlMoCoB5% catalyst. Peaks corresponding to HDS of DBT are shown in FIG. 24A to D. As shown in FIG. 24A, the GC-MS chromatogram of HDS reaction products indicates a complex mixtures, separating out some 500 compounds in every analysis. FIG. 24B shows MS peaks corresponding to unreacted DBT in the analyzed sample. The important peaks corresponding to HDS products were again found to be in low abundances. However, GC peaks corresponding to biphenyl and cyclohexylbenzene were identified and their MS presented in FIGS. 24C and D. The HDS reaction over AlMoCoB5% catalysts thus appears to proceed by the two parallel pathways, direct and indirect hydrodesulfurization reaction.

Example 1

Materials: ammonium molybdate, $(NH_4)_6Mo_7O_{24} \cdot 4H_2O$, purity 98%; cobalt nitrate $(Co(NO)_3 \cdot 6H_2O$, purity 98%, diethylene glycol, $(HOCH_2CH_2)_2O$, purity 99%; decalin, $C_{10}H_{18}$, purity 99%; dibenzothiophene (DBT), $C_{12}H_8S$, purity 98%; and ethanol, $C_2H_6O$, purity 99%, were all purchased from Sigma Aldrich. CNF was prepared by chemical vapor deposition (CVD) method which well-known method.

Synthesis 1: commercial alumina was heated to 500° C. for a heating time of about 3 h to obtain $\gamma$-$Al_2O_3$. Some 9.5 g of $\gamma$-$Al_2O_3$ was mixed with 0.5 g of carbon nanofiber (CNF) to obtain carbon nanofiber-doped $\gamma$-$Al_2O_3$ using the sol-gel method. The mixture was mixed with 100 mL of deionized water, 10 mL ethanol, and 5 mL diethylene glycol, and stirred for 1 hour. The mixture was refluxed at 110° C. for around 6 hours. The resulting precipitate was separated and dried at 100° C., to give an Al-CNF composite. The Al-CNF composite was loaded with Mo nanoparticles (15 wt. %) and Co nanoparticles (5 wt. %), using incipient wetness impregnation. 80 mL of deionized water was added to 4.8 g of the Al-CNF composite under stirring at 85° C. for 35 minutes. Then, 100 mL of aqueous solution of 1.66 g ammonium molybdate and 1.46 g cobalt nitrate were added to the dispersed alumina and kept under stirring at 85° C. for 3 hours. During the stirring, 5 mL of diethylene glycol was added to enhance the connection between the nanoparticles and the alumina support. The resultant mixture was separated and dried at 110° C. for 5 hours. The prepared catalyst was then calcined at 350° C. This exemplary preparation of Al-CNF-MoCo is illustrated in FIG. 1. The same method was used to load $\gamma$-$Al_2O_3$ with MoCo metals, without doping with CNF, for comparison. The prepared catalysts were characterized for structural and morphological properties by BET $N_2$ physisorption, temperature-programmed reduction (TPR), powder X-ray diffraction (XRD), scanning electron microscope (SEM), infrared spectroscopy (FT-IR), and thermogravimetric analysis (TGA).

Evaluation of the CNF-Modified Catalysts Prepared in Example 1: The HDS activity of the Al—MoCo and Al-CNF-MoCo catalysts prepared in Example 1 was separately evaluated using a batch reactor, Model 4848B, purchased from the Parr Instrument Company. The HDS was conducted at 300° C. and 55 bar H2 partial pressure. Around 0.50 g of the each Al—MoCo or Al-CNF-MoCo catalyst was inserted in the reactor vessel with 100 mL of a model fuel, containing dibenzothiophene (DBT) at an initial concentration of 550 ppm-S in decalin. When the reaction temperature reached 300° C., a first sample was collected and considered as the zero point. Thereafter, following each hour of reaction at 300° C., a further sample was collected by a manual valve, and the reaction was monitored for 6 hours. The sulfur concentrations in the collected samples were then analyzed by gas chromatography-mass spectrometry (GC-MS) employing sulfur chemiluminescence detection (GC-SCD).

Example 2

Materials: ammonium molybdate, $(NH_4)_6Mo_7O_{24} \cdot 4H_2O$, cobalt nitrate, $Co(NO_3)_3 \cdot 6H_2O$, boron trifluoride ethylamine complex, $BF_3 \cdot C_2H_5NH_2$, diethylene glycol, ethanol, were obtained from Fluka, and dibenzothiophene (DBT), $C_{12}H_8S$ (purity 98%, MW 184.26 g/mol, d 1.25 g/cm³), was obtained from Sigma Aldrich. Bicyclo[4.4.0]decane, i.e., decahydronaphthalene or decalin, $C_{10}H_{18}$, (98% purity, MW 138.25 g/mol, d~0.896 g/cm³), a colorless liquid was used as a solvent for DBT in preparing model fuels, was obtained from Sigma Aldrich. High purity (18 μS/cm) de-ionized water was used and obtained in-house using ThermoScientific Barnstead Nanopure after distillation with a Labstrong FiSTREEM™ II 2S Glass Still distiller.

Synthesis 2: alumina was loaded with Mo nanoparticles (15 wt. %) and Co nanoparticles (5 wt. %), by incipient wetness impregnation. 7 g of alumina was dispersed in 100 mL of deionized water under stirring at 80° C. for 20 minutes. Then, 50 mL of aqueous solution of ammonium molybdate, $(NH_4)_6Mo_7O_{24} \cdot 4H_2O$, and cobalt nitrate, $Co(NO_3)_3 \cdot 6H_2O$, were added to the dispersed alumina and kept under stirring at 80° C. for 110 minutes. To dope the obtained composite with boron, 50 mL of aqueous solutions of boron trifluoride ethylamine, $BF_3 \cdot C_2H_5NH_2$, were added to the mixture under stirring at 80° C. for 3 hours. During the stirring, 20 mL of diethylene glycol was added to enhance adhesion between the nanoparticles and alumina support. The resultant mixture was filtered and dried at 100° C., FIG. 13 illustrates this method. The filtered catalyst was calcined at 400° C. for 3 hours under the flow of $N_2$ gas. Following the same procedures, alumina-supported CoMo catalysts were doped with different boron percentages (0 wt. %, 2 wt. %, and 5 wt. %) and the final catalysts were labeled AlMoCoB0%, AlMoCoB2%, and AlMoCoB5%, where x % is the boron percentage on the catalyst. Initial results indicated that HDS adding more than 5% showed less HDS performance, so it was surprisingly found that the optimum boron doping on the catalysts was in a range of from 2.5 to 7.5, 3.5 to 5.5, 4 to 5 wt. %, or close to 5 wt %.

Evaluation of the Boron-Modified Catalysts Prepared in Example 2: The HDS activity of the boron-modified catalysts was evaluated using a batch reactor, Parr Instrument Company Model 4848B. FIG. 14 schematically diagrams the system used for the boron-modified catalytic HDS reactions. The HDS reaction was conducted at 300° C. under 50 bar $H_2$ partial pressure. 0.6 g of a respective catalyst, AlMoCoB0%, AlMoCoB2%, and AlMoCoB5%, were inserted in the reactor vessel with 100 mL of the model fuel, containing DBT at an initial concentration 650 ppm-S in decalin. Each test was conducted for 6 hours after achieving the target process conditions. When the reaction temperature reached 300° C., a first sample was collected and considered as zero-hour sample. Thereafter, samples were collected every hour over 6 hours through a manual valve. The sulfur content in the model fuel and the samples were quantified using a GC-SCD, with products identified by GC-MS.

Numerous modifications and variations of the present invention are possible in light of the above teachings. It is therefore to be understood that within the scope of the appended claims, the invention may be practiced otherwise than as specifically described herein.

The invention claimed is:

1. A hydrodesulfurization reaction composition, comprising:
    dibenzothiophene, biphenyl, $H_2S$ and a hydrodesulfurization catalyst,
    wherein the hydrodesulfurization catalyst comprises:
        catalytic material comprising a molybdenum oxide and a cobalt oxide; and
        a hydrodesulfurization catalyst support comprising alumina; and
    wherein the hydrodesulfurization catalyst support further comprises carbon nanofibers dispersed on a surface of the alumina; and
    wherein the hydrodesulfurization catalyst further comprises a dopant comprising boron in an amount such that the boron is present in a range of from 1 to 5.5 wt. % relative to total hydrodesulfurization catalyst weight,
    wherein the catalytic material is homogenously dispersed on the hydrodesulfurization catalyst support.

2. The hydrodesulfurization reaction composition of claim 1, wherein the catalytic material comprises 12 to 18 wt. % of molybdenum, relative to total hydrodesulfurization catalyst weight.

3. The hydrodesulfurization reaction composition of claim 1, wherein the catalytic material comprises 3 to 8 wt. % of cobalt, relative to total hydrodesulfurization catalyst weight.

4. The hydrodesulfurization reaction composition of claim 3, wherein the molybdenum and/or cobalt is present in the form of nanoparticles.

5. The hydrodesulfurization reaction composition of claim 1, wherein the hydrodesulfurization catalyst has a BET surface area in a range of 150 to 230 $m^2/g$.

6. The hydrodesulfurization reaction composition of claim 1, wherein the carbon nanofibers have an average diameter of 20 to 40 μm.

7. The hydrodesulfurization reaction composition of claim 1, wherein the hydrodesulfurization catalyst has a meso-pore surface area in a range of from 165 to 185 $m^2/g$.

8. The hydrodesulfurization reaction composition of claim 1, wherein the hydrodesulfurization catalyst has a total pore volume in a range of from 0.3 to 0.33 $cm^3/g$.

9. The hydrodesulfurization reaction composition of claim 1, wherein the hydrodesulfurization catalyst has an average pore diameter in a range of from 5 to 7 nm.

10. The hydrodesulfurization reaction composition of claim 1, wherein the catalytic material comprises no more than 5 wt. % of sulfur.

* * * * *